(12) United States Patent
Ebadi Shahrivar et al.

(10) Patent No.: US 12,047,882 B2
(45) Date of Patent: Jul. 23, 2024

(54) TECHNIQUES FOR ADAPTIVE POWER MODE CONTROL

(71) Applicant: QUALCOMM Incorporated, San Diego, CA (US)

(72) Inventors: Arash Ebadi Shahrivar, San Diego, CA (US); Peter Pui Lok Ang, San Diego, CA (US); Raghu Narayan Challa, San Diego, CA (US); Alexei Yurievitch Gorokhov, San Diego, CA (US); Aamod Khandekar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 377 days.

(21) Appl. No.: 17/581,294

(22) Filed: Jan. 21, 2022

(65) Prior Publication Data

US 2022/0264468 A1    Aug. 18, 2022

Related U.S. Application Data

(60) Provisional application No. 63/149,814, filed on Feb. 16, 2021.

(51) Int. Cl.
*H04W 52/02* (2009.01)
*H04B 17/309* (2015.01)
(Continued)

(52) U.S. Cl.
CPC ...... *H04W 52/0245* (2013.01); *H04B 17/309* (2015.01); *H04W 24/02* (2013.01); *H04W 52/241* (2013.01)

(58) Field of Classification Search
CPC ............ H04W 52/0245; H04W 24/02; H04W 52/241; H04B 17/309
(Continued)

(56) References Cited

U.S. PATENT DOCUMENTS 10,736,114 B2 *  8/2020  Dillon ..................... H04W 8/22
2009/0069057 A1   3/2009  Haartsen et al.
(Continued)

OTHER PUBLICATIONS

International Search Report and Written Opinion—PCT/US2022/013467—ISA/EPO—Apr. 28, 2022.

*Primary Examiner* — Gbemileke J Onamuti
(74) *Attorney, Agent, or Firm* — Dalei Dong; Holland & Hart LLP

(57) ABSTRACT

Methods, systems, and devices for wireless communications are described. In one example, a method for wireless communications at a user equipment (UE) includes determining one or more performance metrics related to communications over a wireless channel and comparing the one or more performance metrics with a performance level for the communications over the wireless channel. The method may include selecting a power mode for the UE based at least in part on the comparing and determining an operating state of a subset of a plurality of radio frequency front end elements of at least one active radio frequency chain of the UE based at least in part on the power mode and a priority of the one or more performance metrics. The method may also include adjusting the subset of the plurality of radio frequency front end elements based at least in part on the operating state.

30 Claims, 12 Drawing Sheets

(51) Int. Cl.
 *H04W 24/02* (2009.01)
 *H04W 52/24* (2009.01)
(58) Field of Classification Search
 USPC .......................................................... 370/311
 See application file for complete search history.

(56) References Cited

U.S. PATENT DOCUMENTS

| | | |
|---|---|---|
| 2013/0225094 A1 | 8/2013 | Mujtaba et al. |
| 2015/0271755 A1 | 9/2015 | Karri et al. |
| 2020/0314934 A1 | 10/2020 | Raghavan et al. |
| 2020/0412425 A1 | 12/2020 | Laghate et al. |
| 2021/0058131 A1* | 2/2021 | Zhu ........................ H04B 7/063 |

* cited by examiner

TECHNIQUES FOR ADAPTIVE POWER MODE CONTROL

CROSS REFERENCE

The present Application for Patent claims the benefit of U.S. Provisional Patent Application No. 63/149,814 by EBADI SHAHRIVAR et al., entitled "TECHNIQUES FOR ADAPTIVE POWER MODE CONTROL," filed Feb. 16, 2021, assigned to the assignee hereof, which is hereby incorporated by reference in its entirety.

FIELD OF DISCLOSURE

The following relates to wireless communications, including techniques for adaptive power mode control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some operations of a UE may exceed desired performance levels. Many UEs have two power modes: an active state operable during downlink or uplink grants and a sleep state that puts the UE to sleep when there are no grants. During the active state, the UE is operable but may be consuming more power than is necessary to meet performance requirements.

SUMMARY

The described techniques relate to improved methods, systems, devices, and apparatuses that support techniques for adaptive power mode control. Generally, the described techniques provide for a UE to have multiple power modes that may be selected based on performance requirements. The UE may use one or more performance metrics and a performance level to select the power mode in which to operate. The performance metrics may be network metrics or channel metrics. The power mode may determine operating states for a subset of radio frequency front end elements of one or more active radio frequency chains of the UE. The UE may adjust the operating states of the radio frequency front end elements according to the power mode.

A method for wireless communications at a UE is described. The method may include determining one or more performance metrics related to communications over a wireless channel, comparing the one or more performance metrics with a performance level for the communications over the wireless channel, selecting a power mode for the UE based on the comparing, determining an operating state of one or more active radio frequency front end elements of at least one radio frequency chain of the UE based on the power mode and a priority of the one or more performance metrics, and adjusting the one or more active radio frequency front end elements based on the operating state.

In some examples of the method, determining the one or more performance metrics may include determining at least one network metric, where the at least one network metric includes one or more of a number of resource grants, a number of downlink grants, a modulation and coding scheme, a throughput, a latency, a block error rate, a hybrid automatic repeat request state, or combinations thereof.

In some examples of the method, determining the one or more performance metrics may include determining at least one channel metric, where the at least one channel metric includes one or more of a signal-to-noise ratio, a signal-to-interference-plus-noise ratio, a reference signal receive power, a channel quality index, a rank indicator, a channel state feedback, or combinations thereof.

Some examples of the method may further include determining the performance level for the communications over the wireless channel. In some examples of the method may further include determining the priority of the set of multiple performance metrics.

Some examples of the method, apparatuses, and non-transitory computer-readable medium described herein may further include operations, features, means, or instructions for prioritizing the set of multiple performance metrics may be based on one or more availability indicators.

In some examples of the method, determining the operating state of the one or more active radio frequency front end elements of at least one radio frequency chain of the UE based on the power mode and the priority may further include adjusting a first active radio frequency front end element of the one or more active radio frequency front end elements, where the first active radio frequency front end element may have a largest impact on power savings of the one or more active radio frequency front end elements.

In some examples of the method, determining the one or more performance metrics may include calculating an aggregate performance state from the one or more performance metrics, where the comparing the one or more performance metrics with the performance level further includes comparing the aggregate performance state with the performance level.

In some examples of the method, determining the one or more performance metrics may further include averaging each of the one or more performance metrics over a time window.

In some examples of the method, the one or more active radio frequency front end elements include one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

In some examples of the method, determining the power mode for the one or more active radio frequency front end elements of at least one radio frequency chain of the UE may further include determining the power mode based on a look-up table of channel metrics or network metrics.

In some examples of the method, determining the one or more performance metrics may include determining at least one channel metric and at least one network metric.

In some examples of the method, comparing the one or more performance metrics with a performance level for the communications over the wireless channel may include operations, features, means, or instructions for comparing the one or more performance metrics with a threshold based on the performance level.

In some examples of the method, determining the power mode may further include selecting a higher power mode when the one or more performance metrics may be above the threshold and selecting a lower power mode when the one or more performance metrics exceeds the threshold.

Some examples of the method may further include selecting the power mode from a set of three or more power modes based on the comparing.

Some examples of the method may further include determining whether the UE may be operating in a first frequency range or a second frequency range, where determining the operating state of one or more active radio frequency front end elements may be further based on the first frequency range or the second frequency range.

An apparatus for wireless communications at a UE is described. The apparatus may include a processor, memory coupled with the processor, and instructions stored in the memory. The instructions may be executable by the processor to cause the apparatus to determine one or more performance metrics related to communications over a wireless channel, compare the one or more performance metrics with a performance level for the communications over the wireless channel, select a power mode for the UE based on the comparing, determine an operating state of one or more active radio frequency front end elements of at least one radio frequency chain of the UE based on the power mode and a priority of the one or more performance metrics, and adjust the one or more active radio frequency front end elements based on the operating state.

In some examples of the apparatus, the at least one network metric includes one or more of a number of resource grants, a number of downlink grants, a modulation and coding scheme, a throughput, a latency, a block error rate, a hybrid automatic repeat request state, or combinations thereof.

In some examples of the apparatus, the instructions to determine the one or more performance metrics may include instructions for determining at least one channel metric, where the at least one channel metric includes one or more of a signal-to-noise ratio, a signal-to-interference-plus-noise ratio, a reference signal receive power, a channel quality index, a rank indicator, a channel state feedback, or combinations thereof.

Some examples of the apparatus may include instructions for determining the performance level for the communications over the wireless channel. In some examples of the apparatus may include instructions for determining the priority of the set of multiple performance metrics. Some examples of the apparatus may include instructions for prioritizing the set of multiple performance metrics may be based on one or more availability indicators.

In some examples of the apparatus, the instructions to determine the operating state of the one or more active radio frequency front end elements of at least one radio frequency chain of the UE based on the power mode and the priority may include instructions to adjust a first active radio frequency front end element of the one or more active radio frequency front end elements, where the first active radio frequency front end element may have a largest impact on power savings of the one or more active radio frequency front end elements.

In some examples of the apparatus, the instructions to determine the one or more performance metrics may calculate an aggregate performance state from the one or more performance metrics, where the comparing the one or more performance metrics with the performance level further includes instructions to compare the aggregate performance state with the performance level. In some examples of the apparatus, determine the one or more performance metrics may include average each of the one or more performance metrics over a time window.

In some examples of the apparatus, the one or more active radio frequency front end elements include one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

In some examples of the apparatus, the instructions to determine the power mode for the one or more active radio frequency front end elements of at least one radio frequency chain of the UE may include instructions to determine the power mode based on a look-up table of channel metrics or network metrics. In some examples of the apparatus, determine the one or more performance metrics may include determine at least one channel metric and at least one network metric.

In some examples of the apparatus, the instructions to compare the one or more performance metrics with a performance level for the communications over the wireless channel may include instructions for comparing the one or more performance metrics with a threshold based on the performance level.

In some examples of the apparatus, the instructions to determine the power mode may include instructions for selecting a higher power mode when the one or more performance metrics may be above the threshold and selecting a lower power mode when the one or more performance metrics exceeds the threshold.

Some examples of the apparatus may further include instructions for selecting the power mode from a set of three or more power modes based on the comparing.

Some examples of the apparatus may further include instructions for determining whether the UE may be operating in a first frequency range or a second frequency range, where determining the operating state of one or more active radio frequency front end elements may be further based on the first frequency range or the second frequency range.

Another apparatus for wireless communications at a UE is described. The apparatus may include means for determining one or more performance metrics related to communications over a wireless channel, means for comparing the one or more performance metrics with a performance level for the communications over the wireless channel, means for selecting a power mode for the UE based on the comparing, means for determining an operating state of one or more active radio frequency front end elements of at least one radio frequency chain of the UE based on the power mode and a priority of the one or more performance metrics, and means for adjusting the one or more active radio frequency front end elements based on the operating state.

In some examples of the apparatus, the means for determining the one or more performance metrics may include means for determining at least one network metric, where the at least one network metric includes one or more of a number of resource grants, a number of downlink grants, a modulation and coding scheme, a throughput, a latency, a block error rate, a hybrid automatic repeat request state, or combinations thereof.

In some examples of the apparatus, the means for determining the one or more performance metrics may include means for determining at least one channel metric, where the at least one channel metric includes one or more of a signal-to-noise ratio, a signal-to-interference-plus-noise ratio, a reference signal receive power, a channel quality index, a rank indicator, a channel state feedback, or combinations thereof.

Some examples of the apparatus include means for determining the performance level for the communications over the wireless channel. Some examples of the apparatus include means for determining the priority of the set of multiple performance metrics. Some examples of the apparatus include means for prioritizing the set of multiple performance metrics may be based on one or more availability indicators.

In some examples of the apparatus, the means for determining the operating state of the one or more active radio frequency front end elements of at least one radio frequency chain of the UE based on the power mode and the priority may means for adjusting a first active radio frequency front end element of the one or more active radio frequency front end elements, where the first active radio frequency front end element may have a largest impact on power savings of the one or more active radio frequency front end elements.

In some examples of the apparatus, the means for determining the one or more performance metrics may include means for calculating an aggregate performance state from the one or more performance metrics, where the comparing the one or more performance metrics with the performance level further includes comparing the aggregate performance state with the performance level.

In some examples of the apparatus, the means for determining the one or more performance metrics may include means for averaging each of the one or more performance metrics over a time window.

In some examples of the apparatus, the one or more active radio frequency front end elements include one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

In some examples of the apparatus, the means for determining the power mode for the one or more active radio frequency front end elements of at least one radio frequency chain of the UE may include means for determining the power mode based on a look-up table of channel metrics or network metrics.

In some examples of the apparatus, the means for determining the one or more performance metrics may include means for determining at least one channel metric and at least one network metric.

In some examples of the apparatus, the means for comparing the one or more performance metrics with a performance level for the communications over the wireless channel may include means for comparing the one or more performance metrics with a threshold based on the performance level.

In some examples of the apparatus, the means for determining the power mode may include means for selecting a higher power mode when the one or more performance metrics may be above the threshold and selecting a lower power mode when the one or more performance metrics exceeds the threshold. Some examples of the apparatus include means for selecting the power mode from a set of three or more power modes based on the comparing.

Some examples of the apparatus include means for determining whether the UE may be operating in a first frequency range or a second frequency range, where determining the operating state of one or more active radio frequency front end elements may be further based on the first frequency range or the second frequency range.

A non-transitory computer-readable medium storing code for wireless communications at a UE is described. The code may include instructions executable by a processor to determine one or more performance metrics related to communications over a wireless channel, compare the one or more performance metrics with a performance level for the communications over the wireless channel, select a power mode for the UE based on the comparing, determine an operating state of one or more active radio frequency front end elements of at least one radio frequency chain of the UE based on the power mode and a priority of the one or more performance metrics, and adjust the one or more active radio frequency front end elements based on the operating state.

In some examples of the non-transitory computer-readable medium described herein, the instructions for determining the one or more performance metrics may include instructions for determining at least one network metric, where the at least one network metric includes one or more of a number of resource grants, a number of downlink grants, a modulation and coding scheme, a throughput, a latency, a block error rate, a hybrid automatic repeat request state, or combinations thereof.

In some examples of the non-transitory computer-readable medium, the instructions for determining the one or more performance metrics may include instructions for determining at least one channel metric, where the at least one channel metric includes one or more of a signal-to-noise ratio, a signal-to-interference-plus-noise ratio, a reference signal receive power, a channel quality index, a rank indicator, a channel state feedback, or combinations thereof.

Some examples of the non-transitory computer-readable medium further include instructions for determining the performance level for the communications over the wireless channel. Some examples of the non-transitory computer-readable medium further include instructions for determining the priority of the set of multiple performance metrics. Some examples of the non-transitory computer-readable medium further include instructions for prioritizing the set of multiple performance metrics may be based on one or more availability indicators.

In some examples of the non-transitory computer-readable medium, the instructions for determining the operating state of the one or more active radio frequency front end elements of at least one radio frequency chain of the UE based on the power mode and the priority may include instructions for adjusting a first active radio frequency front end element of the one or more active radio frequency front end elements, where the first active radio frequency front end element may have a largest impact on power savings of the one or more active radio frequency front end elements.

In some examples of the non-transitory computer-readable medium, the instructions for determining the one or more performance metrics may include instructions for calculating an aggregate performance state from the one or more performance metrics, where the comparing the one or more performance metrics with the performance level further includes comparing the aggregate performance state with the performance level.

In some examples of the non-transitory computer-readable medium, the instructions for determining the one or more performance metrics may include instructions for averaging each of the one or more performance metrics over a time window.

In some examples of the non-transitory computer-readable medium, the one or more active radio frequency front end elements include one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

In some examples of the non-transitory computer-readable medium, the instructions for determining the power mode for the one or more active radio frequency front end elements of at least one radio frequency chain of the UE may include instructions for determining the power mode based on a look-up table of channel metrics or network metrics.

In some examples of the non-transitory computer-readable medium, the instructions for determining the one or more performance metrics may include instructions for determining at least one channel metric and at least one network metric.

In some examples of the non-transitory computer-readable medium, the instructions for comparing the one or more performance metrics with a performance level for the communications over the wireless channel may include instructions for comparing the one or more performance metrics with a threshold based on the performance level.

In some examples of the non-transitory computer-readable medium, the instructions for determining the power mode may include instructions for selecting a higher power mode when the one or more performance metrics may be above the threshold and selecting a lower power mode when the one or more performance metrics exceeds the threshold.

Some examples of the non-transitory computer-readable medium described herein may further include instructions for selecting the power mode from a set of three or more power modes based on the comparing.

Some examples of the non-transitory computer-readable medium described herein may further include instructions for determining whether the UE may be operating in a first frequency range or a second frequency range, where determining the operating state of one or more active radio frequency front end elements may be further based on the first frequency range or the second frequency range.

DETAILED DESCRIPTION

Figure 1:
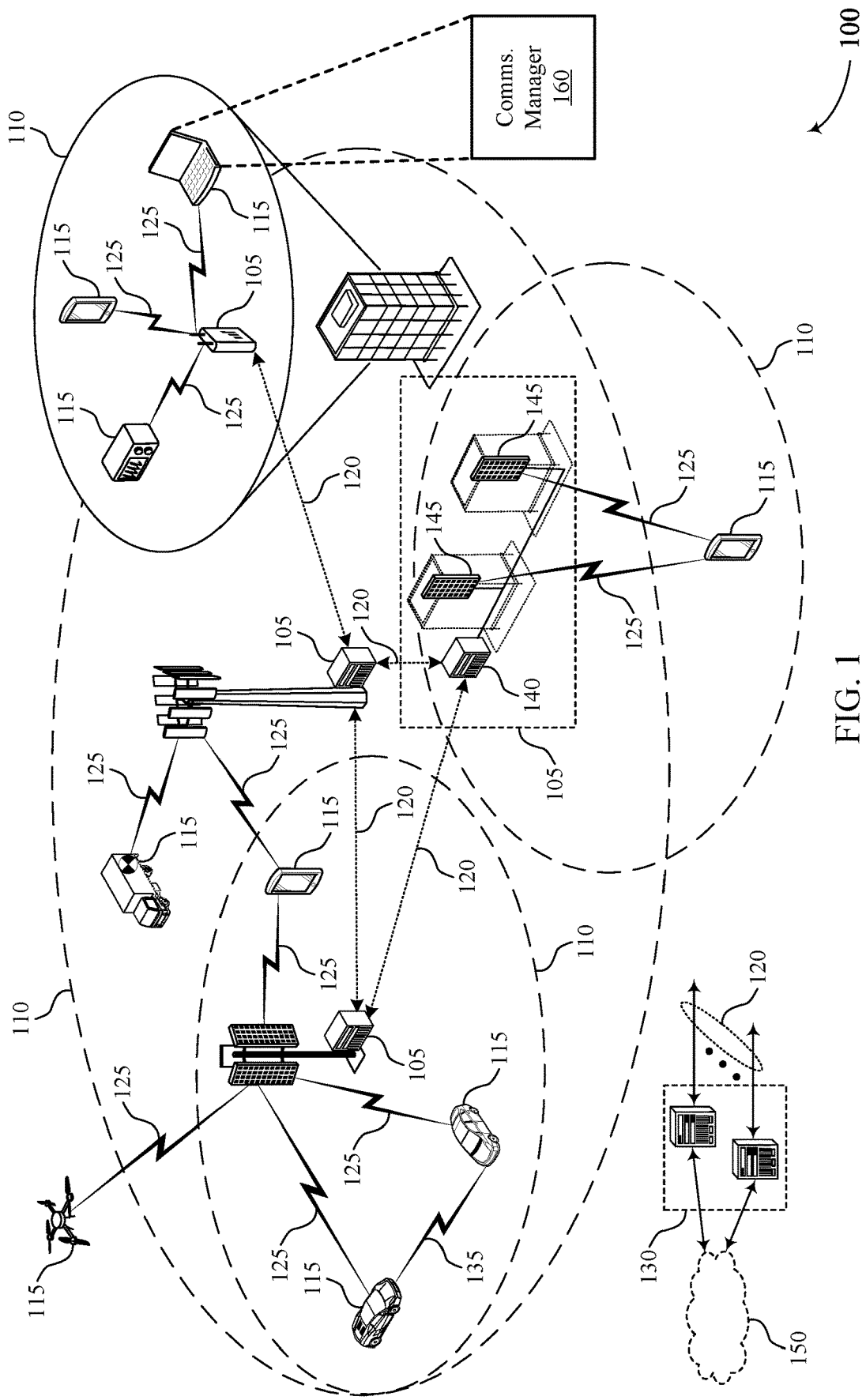
FIG. 1 illustrates an example of a wireless communications system that supports techniques for adaptive power mode control in accordance with various aspects of the present disclosure.

Techniques described herein enable a UE to operate in different power modes while in an active state. An active state may be when a UE is awake (e.g., not in a sleep state) and may be receiving or transmitting. The active state may be during a downlink grant of a base station associated with the UE or when the UE has received an uplink grant, for example. The techniques described herein provide a UE with a way to more closely match its performance to any performance requirements for the wireless communications at the UE in order to reduce power consumption. A UE with just a single active power mode, such as an awake mode, may sometimes perform better than is needed for the given communications and environment. For example, the intended recipient of a transmission from the UE may be close or in a favorable wireless environment, and the UE may receive with higher power or a lower modulation and coding scheme (MCS) than is needed for the transmission to be received. The UE may unnecessarily consume additional power when it exceeds the performance requirements. The UE may be able to save power and still meet the performance requirements by selecting and using a power mode that better matches the performance of the UE to the performance requirements.

If the performance metrics show that the UE is performing better than necessary (e.g., at a higher level than a defined performance level or requirement), then the UE may change its power mode in order to save power. For example, if the channel or network metrics shows that the UE is operating better than it needs to in order to meet the desired performance level, the UE may reduce its power state in order to save power, while still performing adequately. Alternatively, if the performance metrics show that the UE is not performing at the performance level, the power mode may be changed in order to improve performance. For example, a UE that was meeting the performance level may have experienced a change (e.g., changed location, new interference, etc.) such that the UE is no longer meeting the performance level. The UE may increase its power mode, and also its power consumption, in order to meet the performance level under the new conditions.

Some techniques described herein include a UE receiving or determining performance metrics that the UE compares to a desired performance level in order to determine a power mode for the UE. The power mode may be used to set an operating state of a subset of the plurality of radio frequency front end (RFFE) elements of an active radio frequency (RF) chain of the UE. The performance metrics may be network metrics or channel metrics, or combinations thereof. Network metrics may include a number of resource grants, a number of downlink or uplink grants, an MCS, a throughput, a latency, a block error rate (BLER), a hybrid automatic repeat request (HARM) state, or combinations thereof. The channel metrics may include a signal-to-noise ratio (SNR), a signal-to-interference-plus-noise ratio (SINR), a reference signal receive power (RSRP), a channel quality index (CQI), a rank indicator (RI), a channel state feedback (CSF), or combinations thereof. The performance metrics may be solely network metrics or channel metrics, or both types of metrics. The UE may determine the network metrics or channel metrics itself or receive information related to the network metrics or the channel metrics from another device, such as a base station.

Changing an operating state of the one or more RFFE elements may cause the RFFE elements to consume more or less power. Which elements of the one or more RFFE elements can be changed may be based on which frequency range the UE is operating in, such as, for example, frequency range 1 (FR1) and frequency range 2 (FR2) in 5G systems. When the UE is operating in FR1, changing the operating states of the RFFE elements may include a digital filter order reduction, residual sideband (RSB) mitigation, an analog-to-digital converter (ADC) order reduction, a bias current reduction, an analog filter linearity relaxation, a number of filter taps, or the like. When the UE is operating in FR2, changing the operating states of the RFFE elements may include an ADC order reduction and resolution bit reduction, using alternative low noise amplifier (LNA) gain states, digital front end (DFE) bit width reduction, a number of filter taps, changing a number of antenna elements or beams for an antenna array, or the like.

Availability indicators may be used to help prioritize the use of the performance metrics, including the presence of grants, MCS, BLER, CQI, and SNR. The UE may use the priority of the performance metrics to decide which RFFE elements to adjust. For example, the UE may adjust the operating state of an RFFE element that has the most or the least impact on the power consumption or performance.

In some examples, the UE may utilize a look-up table to determine which power mode to use based on the performance metrics or the performance level.

The UE may periodically assess the performance metrics and compare them with the performance level to ensure the UE is balancing performance with power savings. However, several techniques may also be applied to reduce unwanted frequent power mode switching, such as averaging the performance metrics over a time window, calculating a combination of performance states, and applying hysteresis at decision points.

Aspects of the disclosure are initially described in the context of wireless communications systems. Aspects of the disclosure are further illustrated by and described with reference to block diagram, swim diagrams, and flowcharts that relate to techniques for adaptive power mode control. Aspects of the disclosure are further illustrated by and described with reference to apparatus diagrams, system diagrams, and flowcharts that relate to techniques for adaptive power mode control.

FIG. 1 illustrates an example of a wireless communications system 100 that supports techniques for adaptive power mode control in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep state when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may include a communications manager 160. The communications manager 160 may include a power mode controller and use techniques described herein to select a power mode and adjust one or more RFFE elements. The communications manager 160 may determine one or more performance metrics related to communications over a wireless channel and compare the one or more performance metrics with a performance level for the communications over the wireless channel. The communications manager 160 may select a power mode for the UE based at least in part on the comparison. The communications manager 160 may determine an operating state of subset of the plurality of RFFE elements of at least one active RF chain of the UE based at least in part on the power mode and a priority of the one or more performance metrics and adjust the subset of the plurality of RFFE elements based at least in part on the operating state.

The communications manager 160 may improve battery life, reduce power savings at the UE, improve throughput, improve reliability of communications, and reduce interference with other devices.

Figure 2:
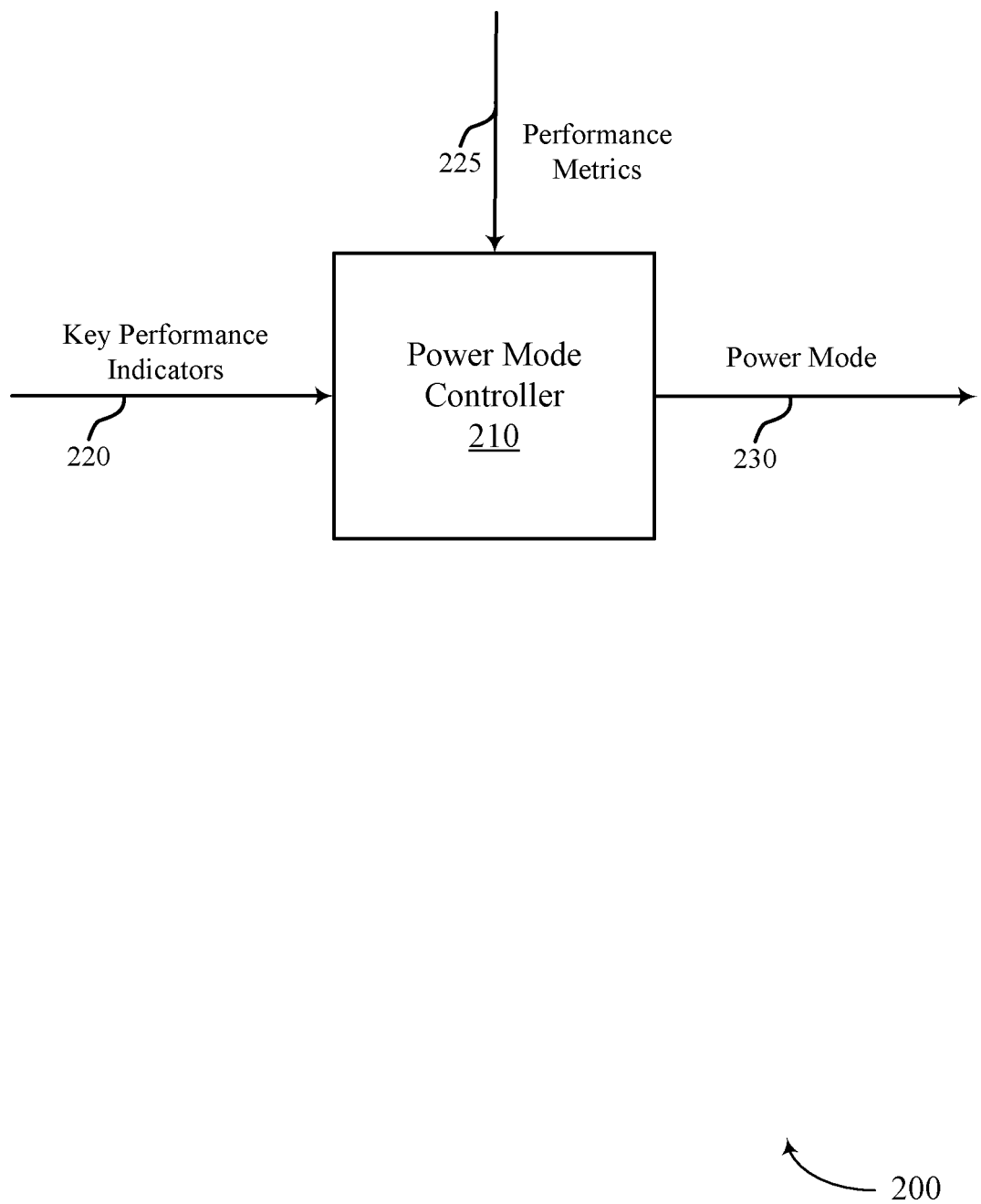
FIG. 2 illustrates an example of a block diagram that supports techniques for adaptive power mode control in accordance with various aspects of the present disclosure.

FIG. 2 illustrates an example of a block diagram 200 that supports techniques for adaptive power mode control in accordance with various aspects of the present disclosure. The block diagram 200 includes a power mode controller 210, which may implement various aspects of the communications manager 160 or may be implemented by various aspects of the communications manager 160, among other examples. The power mode controller 210 may implement various aspects of the wireless communications system 100 or may be implemented by various aspects of the wireless communications system 100, among other examples.

The power mode controller 210 may receive inputs, determine a power state for a UE to operate in, and output the power state. The power mode controller 210 may be part of a communications manager, such as communications manager 160 as shown in FIG. 1. The power mode controller 210 may perform at least some of the techniques described herein to select which of a plurality of power modes the UE should operate in, which may provide power savings at the UE. Each of these power modes, from the transceiver perspective, may have different capabilities, for example SNR cap, linearity, RSSI range that they can support, and the like.

The power mode controller 210 may select from N possible power modes (PMs), where N is the number of power modes the UE can support. Each power mode may have different RFFE or transceiver operating states. For example, each power mode may define a different operating state for one or more RFFE elements in each of the RF chains of the UE. An RF chain may be a set of electronic components and sub-units related to signal processing. An RF chain may include amplifiers, mixers, attenuators, filters, detectors, converters, or other components related to RF signal processing. A UE may include one or more RF chains. In some examples, components of an RF chain may be used for communications and for other purposes, such as radar. Different RF chains may be used for different frequency bands. For example, FR1 and FR2 may use different sets of RF chains within the same UE. Although some examples of a UE may include multiple RF chains, which respectively may be associated with (e.g., tailored to, calibrated or configured for, corresponding to) different frequency bands, other examples of a UE may include an RF chain that supports communications over multiple frequency bands.

The RFFE elements within an RF chain may include SNR cap, linearity, RSSI range, digital filter order reduction (RSB mitigation), ADC order reduction, bias current reduction, analog filter linearity relaxation, resolution bit reduction, alternative LNA gain states, DFE bit width reduction, a number of antenna elements used, a number of beams for an antenna array, and combinations thereof. Each of these elements may affect the power consumption at the UE. The power mode controller 210 may adjust any of these elements in order to change the functioning of the UE according to a metric, such as power consumption, transmission power, or the like. For a given power, the UE will have different qualities for communications.

Table 1 provides an example of power modes, their power consumption in milliwatts (mw), and their SNR cap in decibels (dB). In other examples, other numbers of power modes, resulting power consumption, and SNR caps may be used. In Table 1, the highest power mode is PM(N-1) and the lowest power mode is PM(0). The highest power mode has the highest power consumption and the highest SNR cap (e.g., 30 dB), while the lowest power mode is PM(0) and has the lowest SNR cap (e.g., 10 dB). By reducing the power consumption all the way to PM(0), the UE has a smaller SNR cap (e.g., the PM(0) can support 10 dB).

TABLE 1

| Power Mode | Power Consumption (mw) | SNR Cap (dB) |
| --- | --- | --- |
| PM(N − 1) | P(N − 1) mw | SNR(N − 1) (30 dB) |
| PM(N − 2) | P(N − 2) mw | SNR(N − 2) (20 dB) |
| ... | ... | ... |
| PM(0) | P(0) mw | SNR(0) (10 dB) |

Using the performance metrics, the power mode controller 210 may select the power mode with the lowest power consumption that meets the requirements, without effecting the UE's performance or capabilities. The power mode controller 210, at any instant of time, may use the parameters to determine what the SNR the UE is expected to overcome. For example, if the SNR is 5 dB, there is no need for the UE to operate at a power mode higher than PM(0). For example, there is no need for the UE to operate in PM(N-1) and consume power to meet an SNR cap of 30 dB when 5 dB is all that is required. The difference in power consumption between PM(N−1) and PM(0) reflects the power savings in this example. In other examples, other SNR caps may be used.

The selected power mode may determine which elements of each RF chain is being used and how they are being used. Each RF chain may have different filters, Amplifiers, ADCs, how many bits are used to represent a number, or the like. All of these RF chains may be used to operate to get the signal stream to a modem at the end of the RF chain. The performance of each of the RFFE elements may be changed. For example, the performance of some of the RFFE elements may be reduced by reducing power consumption and eliminating some of the features. For example, the power consumption of an ADC can be reduced by reducing the number of bits it uses. The resolution and quality may be reduced by reducing the number of bits, but as long as the performance requirements are still met, this results in power savings. As another example, an AGC can work with a different AGC gain stages, which may affect performance but reduce power consumption. The operations of a filter may be changed by implementing a specific number of taps. By reducing the taps, extra residuals may result from the outer band, but if the level is reduced to a value that can be tolerated, power savings can result. Those are just some examples of how the power mode controller 210 can achieve different power modes, and many more examples are contemplated.

The power mode controller 210 may receive key performance indicators (KPIs) 220 as input. The KPIs 220 may include some network related key performance indicators, such as MCS, BLER, and grants (e.g., UL and DL grants), or the like. The KPIs 220 may also include some channel related key performance indicators, such as CQI, SNR, or the like.

The power mode controller 210 may also receive performance metrics 225. The performance metrics 225 may be input into the power mode controller 210 from another component of the UE. The performance metrics 225 may include network metrics or channel metrics, or both. The network metrics may include a number of resource grants, a number of DL or UL grants, an MCS, a throughput, a latency, a BLER, a HARQ state, or combinations thereof. The channel metrics may include an SNR, an SINR, an RSRP, a CQI, an RI, CSF, or combinations thereof. The UE may determine the network metrics or channel metrics itself or receive information related to the network metrics or the channel metrics from another device, such as a base station. For each metric, the power mode controller 210 may define a performance state as a function of the metric. For example, the performance state of m may correspond to PM(m).

Using the KPIs 220, the performance metrics 225, and a performance requirement which also may be known, the power mode controller 210 may determine a power mode 230. The power mode controller 210 may compare the performance metrics 225 with the performance requirement to determine which power mode 230 can be used. The power mode controller 210 may output an indication of the power mode 230 to one or more components of the UE. The UE may use the power mode 230 to adjust one or more operating states of one or more RFFE elements of one or more RF chains.

In some examples, when the UE does not receive a grant for longer than a time period, denoted $T_{activity}$, the power mode controller 210 may select a default power mode. The default power mode may be the lowest power mode in the awake state, such as PM(0) in Table 1. The power mode controller 210 may use the KPIs 220 to trigger a review of or change in power mode. The power mode controller 210 may also use the KPIs 220 to determine when to enter the default power mode.

The power mode controller 210 may select the power mode with the lowest power consumption without effecting the performance of the UE. Thus, the power mode controller 210 may use adaptive techniques for power savings.

Figure 3:
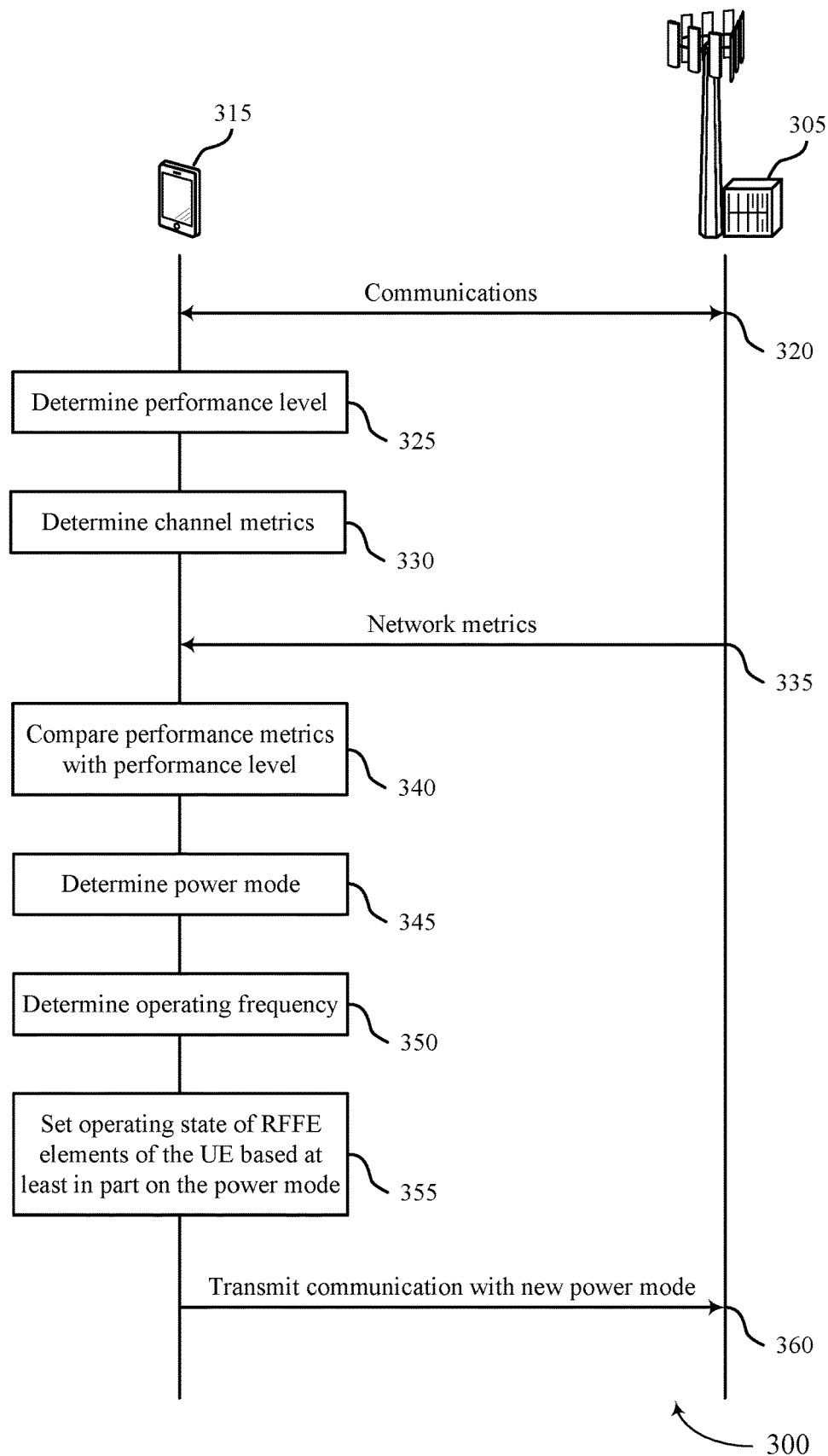
FIG. 3 illustrates an example of a diagram that supports techniques for adaptive power mode control in accordance with various aspects of the present disclosure.

FIG. 3 illustrates an example of a diagram 300 that supports techniques for adaptive power mode control in accordance with various aspects of the present disclosure. The diagram 300 may implement various aspects of the wireless communications system 100 or may be implemented by various aspects of the wireless communications system 100, among other examples. The diagram 300 may include a base station 305 and a UE 315. The base station 305 may be an example of aspects of a base station 105 as described herein. The UE 315 may be an example of aspects of a UE 115 as described herein.

At 320, the base station 305 and the UE 315 engage in wireless communications. The UE 315 may have an UL grant or DL grant, for example. Thus, the UE 315 is in an active state. Frequently or periodically, the UE 315 may determine which power mode to operate in. In some examples, the UE 315 may assess its power mode based on a KPI.

At 325, the UE 315 may determine a performance level. The performance level may be a performance requirement for communications at the UE, including, for example, a CQI level, RSSI level, SNR, SINR, or the like. The performance level is the quality level of the communications that the UE 315 transmits. Using techniques described herein, the UE may select the lowest power mode that meets the performance level.

At 330, the UE 315 may determine one or more channel metrics. The UE 315 may calculate the channel metrics based on measurements taken at the UE 315. At 335, the UE 315 may receive one or more network metrics from the base station 305. Although FIG. 3 shows the UE 315 receiving the network metrics from the base station 305, in some examples, the UE 315 may determine the one or more network metrics using its own measurements and calculations. Additionally, in some examples, the UE 315 determines or receives only channel metrics or only network metrics.

At 340, the UE 315 may compare the performance metrics with the performance level. The performance metrics may show how the UE 315 has been operating in comparison to the performance level. For example, the UE 315 may be operating below the performance level, indicating that the UE 315 may want to increase its power mode. Alternatively, the UE 315 may be exceeding the performance level, which may indicate that the UE 315 may be able to reduce the power mode, and thus save power.

Table 2 shows an example of performance states for different performance metrics. $D_x$ indicates the performance state of the RFFE or the transceiver ($D_x$ may indicate $PM(D_x)$). In some examples, the final performance state can be calculated as combination of performance states.

TABLE 2

| Metric | Performance State |
|---|---|
| MCS | $D_{MCS} = f(MCS, DL\ layers)$ |
| BLER | $D_{BLER} = f(BLER, MCS, DL\ layers)$ |
| CQI | $D_{CQI} = \sum_{i=1}^{N-1} I(CQI > CQI_{threshold_i}(RI))$ |
| SNR | $D_{SNR} = \sum_{i=1}^{N-1} I(mean(SNR) > SNR_{threshold_i}(RI))$ |

The factor l(x) may be defined according to the following equation:

$$I(x) = \begin{cases} 1 & x > 0 \\ 0 & x < 0 \end{cases}$$

In some examples, the performance state parameters may define which power mode the UE 315 may stay at, because $D_x$ may indicate the performance state of the RFFE or the transceiver and may indicate $PM(D_x)$. Taking SNR as an example, the UE 315 may have several RF chains with SNR values. The UE 315 may calculate the mean of the SNR and apply threshold values to the SNR. The threshold values may depend on the number of layers for the RF chain. For each power mode (e.g., N power modes), there may be N−1 thresholds that the UE 315 can compare to the SNR. If the SNR is very high, the result of this comparison is likely going to be N−1 (relating to the highest SNR). This may indicate that the UE is at the highest performance. However, if the SNR is really small, then the result of this calculation, DSNR, may be 0 or close to 0. In that case, the UE 315 may operate at the lowest power mode, PM(0). In other examples, other functions may be used for BLER and MCS and the number of layers may be considered to determine the performance levels.

In some examples, the final performance state can be calculated as combination of performance states. In some example, the performance metrics may be aggregated together or averaged. In some examples, each performance metric may be averaged over a time window to smooth out any sudden variations over time. That is, each metric may be averaged out over some time to reduce the effects of fluctuations that happen over the wireless channel.

The threshold values for switching between the power modes can be determined for each UE 315 based on its performance characteristic. Additionally, hysteresis may be added to the thresholds to reduce the chance of ping-ponging between different power modes. For example, a threshold for switching from PM(0) to PM(1) may not be identical to the threshold for switching from PM(1) to PM(0).

At 345, the UE 315 may determine which power mode to select. The power mode controller may use these performance states to determine which power mode to choose. For each metric, the UE 315 may define the state function that indicates if the performance metric is available or not. An availability indicator for each performance metric may be used that looks at each metric. If the UE 315 has received at least one sample of that performance metric within the last time period window (denoted $Y_{msec}$), then the indicator may show if the performance metric is available or not. The UE 315 may use the availability indicators to prioritize the use of the performance metrics. In some examples, the order of priority may be indicated as in Table 2 (e.g., MCS is highest). The UE 315 may use a combination of the performance metrics to determine the power mode. For example, if a DL grant is available, the UE 315 may use MCS and BLER. Alternatively, if a DL grant is not available, the UE 315 may use CQI if available. If the CQI is not available, then the UE 315 may use the SNR. These techniques apply an additional layer of granularity over UEs that only use grants to determine wake or sleep modes, or determine whether to turn on or off an RF chain. The techniques described herein enable modifying elements or blocks within an RF chain, without turning off the entire RF chain. This provides more power modes which can be used for improved power savings while a UE has a DL or UL grant.

In some examples, the UE 315 may choose the lowest power mode as frequently as possible. This may result in more power savings when the UE 315 does not receive a grant for a long period of time (e.g., longer than $T_{activity}$).

In some examples, the UE 315 may use one or more look-up tables to select the power mode. The look-up tables may indicate different power modes for different performance metrics, combinations of performance metrics, and performance levels. In some examples, the UE 315 may store the one or more look-up tables. In other examples, the UE 315 may be pre-configured with the one or more look-up tables. In yet other examples, the UE 315 may send a request for querying one or more look-up tables.

In some examples, the UE 315 may determine its operating frequency or which radio access technology (RAT) is used before setting the operating state of any RFFE elements, as at 350. The ways of achieving power savings by modifying RFFE elements may be different based on the operating frequency or RAT. For example, the UE 315 may be operating in FR1 or FR2. For FR2, in mmW, for example, power savings can be achieved using a different set of techniques than for FR1. A UE operating in FR2 may use the same ADC order reduction, Resolution bit reduction, different LNA gain settings, DFE bit width reduction than for FR1. Additionally, FR2 may have a MIMO aspect, wherein the number of antenna elements may be changed to reduce or increase the number of MIMO elements in operation. Furthermore, the number of beams that are used for a given antenna array may be altered to reduce the power consumption. As used herein, modifying RFFE elements may also include modifying any transceiver elements as well.

At 355, the UE may set the operating state of one or more RFFE elements or transceiver elements based at least in part on the selected power mode. In some examples, the one or more RFFE elements of an RF chain are modified to increase or decrease performance, which may increase or decrease power consumption, respectively. In some examples, each power mode defines how to modify the one or more RFFE elements. Some power modes may be defined to reduce the performance of each RFFE element to a point that can be tolerated for that performance level. Other examples of power modes may be defined to reduce the performance a subset of RFFE elements. In some examples, a subset of RFFE elements may include all of the RFFE elements. Changing some RFFE elements have more of an effect on performance or power savings than others, so the power modes may be defined taking those effects into consideration. For example, those RFFE elements consuming the most power may be modified first. In some examples, the number of layers of an RF chain may stay the same but the number of RFFE elements being used within the RF chain may be altered.

UE 315 may also set the operating states based on a priority. The priority may be based on the performance metrics. For example, those RFFE elements that affect performance metrics having the highest priority may be altered last or first.

Once the new operating states are set, the UE 315 may continue to receive according to the new power mode at 360. The receptions may be performed using the modified RFFE elements of the active RF chains and transceivers.

Figure 4:
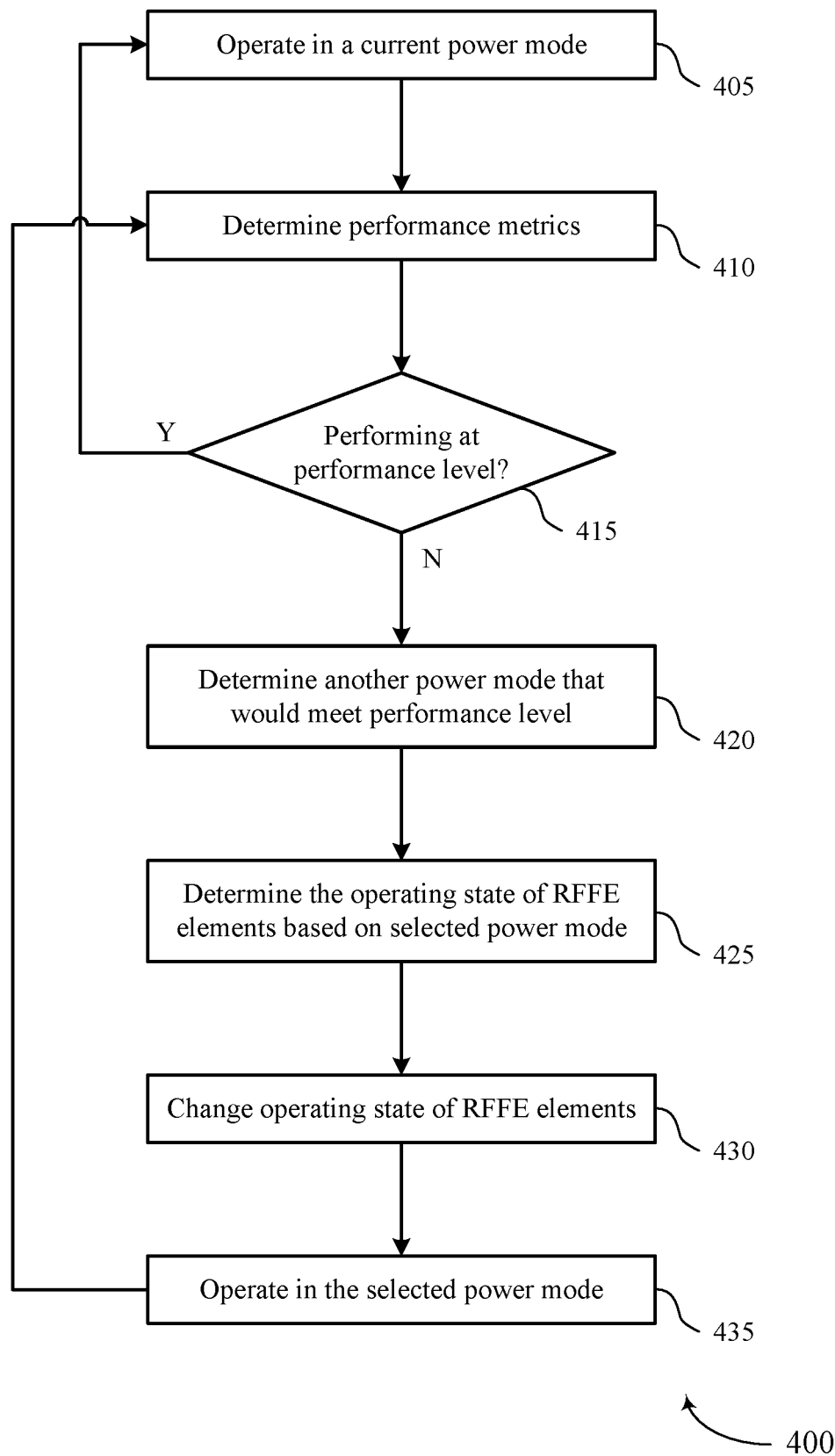
FIGS. 4 and 5 illustrate examples of flowcharts that support techniques for adaptive power mode control in accordance with various aspects of the present disclosure.

FIG. 4 illustrates an example of a flowchart 400 that supports techniques for adaptive power mode control in accordance with various aspects of the present disclosure. The flowchart 400 may implement various aspects of the wireless communications system 100 or may be implemented by various aspects of the wireless communications system 100, among other examples. The flowchart 400 may be implemented by a UE as described herein, such as a UE 115 of FIG. 1 or a UE 315 of FIG. 3.

At 405, a UE may be operating in a current power mode. The current power mode may be any of PM(N-1) through PM(0) as described herein. On occasion, the UE may perform the method of flowchart 400 in order to ensure it is using the lowest suitable power mode available for the given performance requirements. The occasion may be based on a configured periodicity, when a trigger event occurs (such as a handover or other event), or based on a change in an availability indicator, for example.

At 410, the UE may determine one or more performance metrics. The performance metrics may be network metrics or channel metrics as described herein. The UE may determine some or all of the performance metrics itself or may receive information related to the performance metrics.

At 415, the UE may determine whether the UE is operating at the required performance level based on a comparison of the one or more performance metrics to one or more thresholds or performance indicators. If the UE is operating at the performance level, without exceeding it, the UE may return to 405 and continue to operate in the current power mode. The determination of the UE operating within the performance level may be based on a hysteresis threshold.

However, if the UE is operating above or below the performance level (e.g., the UE is operating a threshold amount above or below the performance level), the UE may determine whether it can change its power mode to operate more closely to the performance level. At 410, the UE may determine if there is another power mode that meets the performance level. The UE may determine the other power mode based on the techniques described herein.

If there is another, more suitable power mode, the UE may determine one or more operating states of one or more RFFE elements of one or more RF chains of the UE according to the more suitable power mode at 425. The UE may select the more suitable power mode as a new power mode to operate in. The UE may determine how to change the operating states of the one or more RFFE elements based on the selected power mode. The UE may make these changes. In some examples, the UE may provide a notification of the change to any devices with which the UE is communicating. In other examples, the UE makes the change without providing any notifications to other devices.

At 435, the UE may operate in the selected power mode. Whenever it is determined that the UE should check if its selected power mode is meeting the performance requirements, the UE may return to 410 to check the performance metrics against the performance requirement. The UE may repeat this process as often as configured or desired. The frequency of checking the power mode may be based at least in part on a balance between power savings from the technique and power consumption by performing the method. The frequency may also be modulated based on factors such as mobility of the UE, changes in the wireless channel, interference levels, an update rate of the network or channel metrics, or the like.

Figure 5:
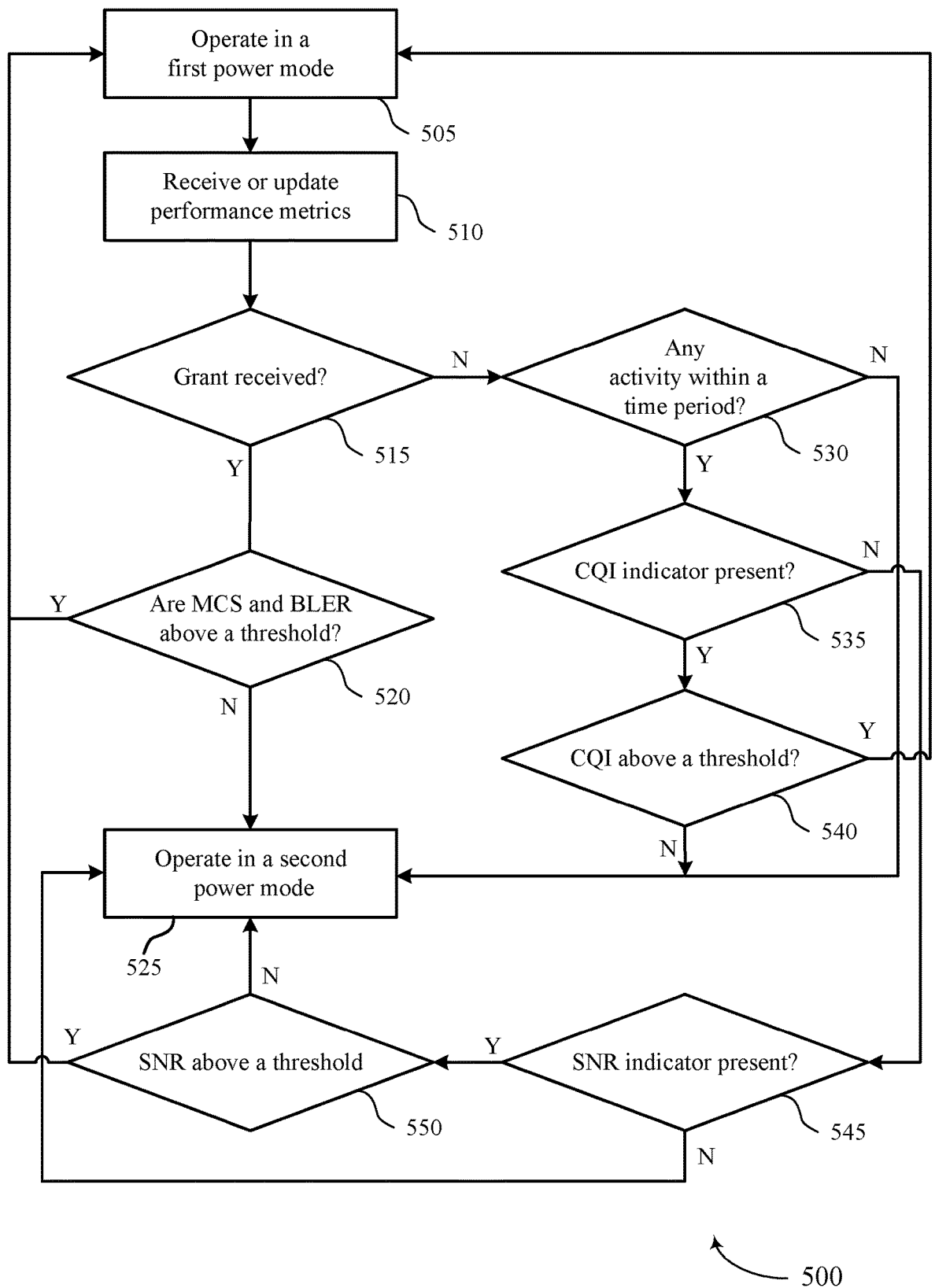

FIG. 5 illustrates an example of a flowchart 500 that supports techniques for adaptive power mode control in accordance with various aspects of the present disclosure. The flowchart 500 may implement various aspects of the wireless communications system 100 or may be implemented by various aspects of the wireless communications system 100, among other examples. The flowchart 500 may be implemented by a UE as described herein, such as a UE 115 of FIG. 1 or a UE 315 of FIG. 3. The flowchart 500 may show an example of how availability indicators may be used to select between two different power modes. Other example flowcharts may be used for different numbers of power modes.

At 505, a UE may be operating in a current power mode. The current power mode may be any of PM(N-1) through PM(0) as described herein. On occasion, the UE may perform the method of flowchart 500 in order to ensure it is using the lowest suitable power mode available for the given performance requirements, as described herein.

At 510, the UE may receive or update one or more performance metrics. The performance metrics may be network metrics or channel metrics as described herein. The UE may update some or all of the performance metrics itself or may receive information related to the performance metrics.

At 515, the UE may determine whether a grant has been received. A grant may be an uplink grant or a downlink grant. If a grant has been received, the flowchart 500 may proceed to 520. At 520, the UE determines both an MCS and a BLER is above a threshold value. If not, the UE proceeds to 525 and operates in a second power mode. The second power mode may be selected according to techniques described herein. If both MCS and BLER are above the threshold value, the flowchart 500 may proceed to 505 and the UE continues to operate in the first power mode.

Returning to the decision point of 515, If the UE has not received a grant, the flowchart 500 may proceed to 530. At 530, the UE determines whether there has been any activity within a time period. The time period may be $T_{activity}$, as described herein. The activity may be reflected in any change to reception of any grants, for example. If there has been no activity, the UE proceeds to 525 and operates in the second power mode. However, if there has been activity, the UE proceeds to 535.

At 535, the UE may determine whether there is a CQI indicator present. If there is a CQI indicator present, the flowchart 500 may determine whether the CQI is above a threshold value at 540. If not, the UE proceeds to 525 and operates in the second power mode. If the CQI is above the threshold value, the flowchart 500 proceeds to 505 and continues to operate in the first power mode.

Returning to 535, if there is no CQI indicator present, the flowchart 500 proceeds to 545. At 545, the UE may determine whether there is an SNR indictor present. If not, the UE proceeds to 525 and operates in the second power mode. However, if there is an SNR indicator present, then the flowchart 500 proceeds to 550. At 550, the UE may determine whether the SNR is above a threshold value. If not, the UE proceeds to 525 and operates in the second power mode. However, if the SNR is operating above the threshold value, the flowchart 500 returns to 505 and the UE continues to operate in the first power mode.

As an illustrative example, the UE may operate with two active power modes (in addition to a sleep mode). The active power modes may be PM(1) and PM(0). Assume for the purposes of this example that the UE is operating in a low power mode, PM(0). When the UE receives any performance metric, it may look to the possibility of indicator functions, which may indicate if the UE has a grant. If the UE has received a grant, it may look at the MCS and BLER. Based on that, if it is above a threshold, the UE may go into the high power mode (PM(1)). If MCS and BLER are below the threshold, then the UE may remain in the low power mode. However, if the UE has not received any grants, then the UE may look at its activity to see there has been any activity within a previous time period (e.g., 100, 200, or 400 ms, for example). If there is no activity, the UE can stay in low power mode. However, if there is activity, then the UE can look sequentially at CQI and SNR to determine the power mode.

Figure 6:
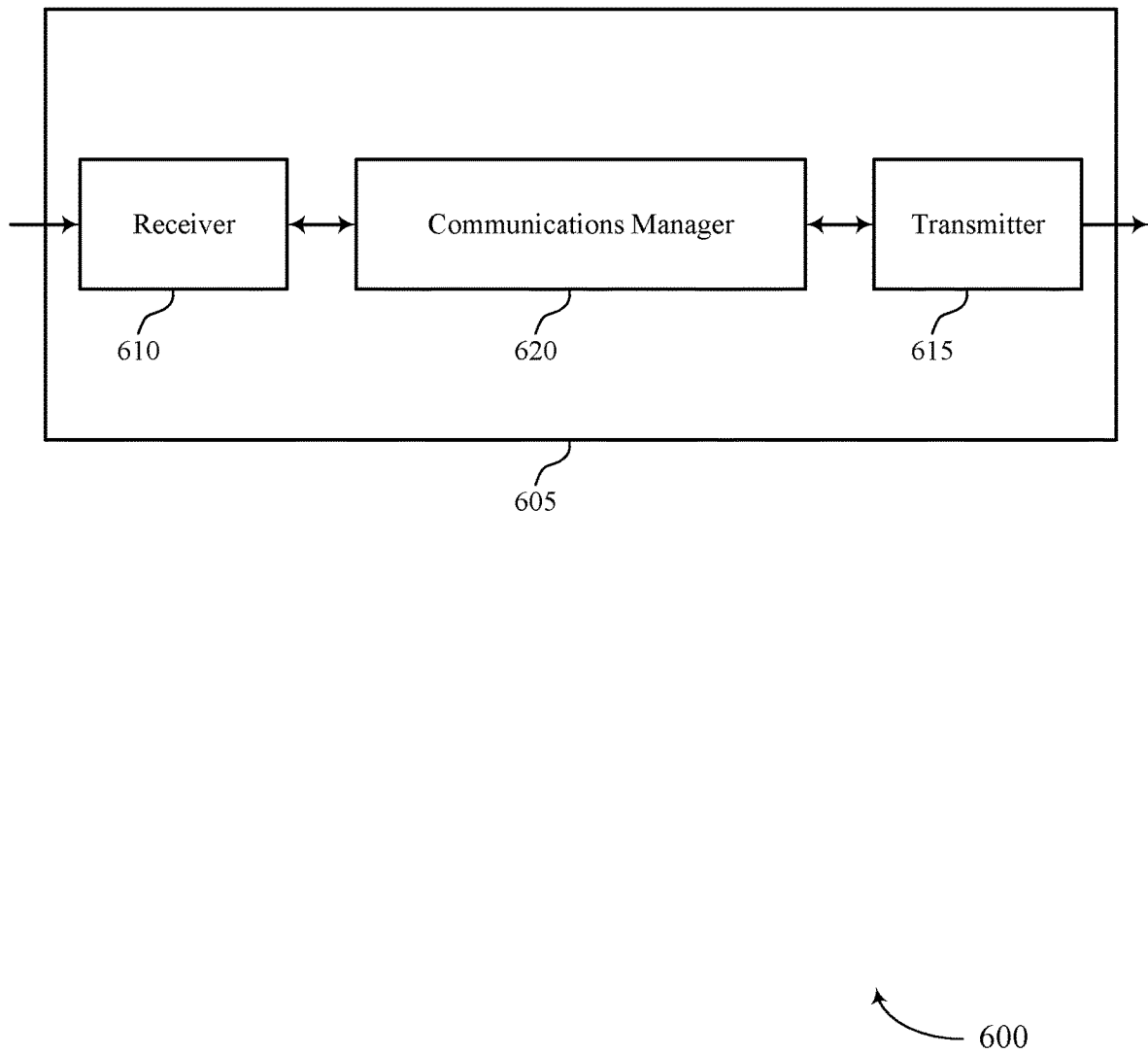
FIGS. 6 and 7 show block diagrams of devices that support techniques for adaptive power mode control in accordance with various aspects of the present disclosure.

FIG. 6 shows a block diagram 600 of a device 605 that supports techniques for adaptive power mode control in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adaptive power mode control). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for adaptive power mode control). In some examples, the transmitter 615 may be co-located with a receiver 610 in a transceiver. The transmitter 615 may utilize a single antenna or a set of multiple antennas.

The communications manager 620, the receiver 610, the transmitter 615, or various combinations thereof or various components thereof may be examples of means for performing various aspects of techniques for adaptive power mode control as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for determining one or more performance metrics related to communications over a wireless channel. The communications manager 620 may be configured as or otherwise support a means for comparing the one or more performance metrics with a performance level for the communications over the wireless channel. The communications manager 620 may be configured as or otherwise support a means for selecting a power mode for the UE based on the comparing. The communications manager 620 may be configured as or otherwise support a means for determining an operating state of a subset of a plurality of radio frequency front end elements of at least one active radio frequency chain of the UE based on the power mode and a priority of the one or more performance metrics. The communications manager 620 may be configured as or otherwise support a means for adjusting the one or more active radio frequency front end elements based on the operating state.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing power consumption.

Figure 7:
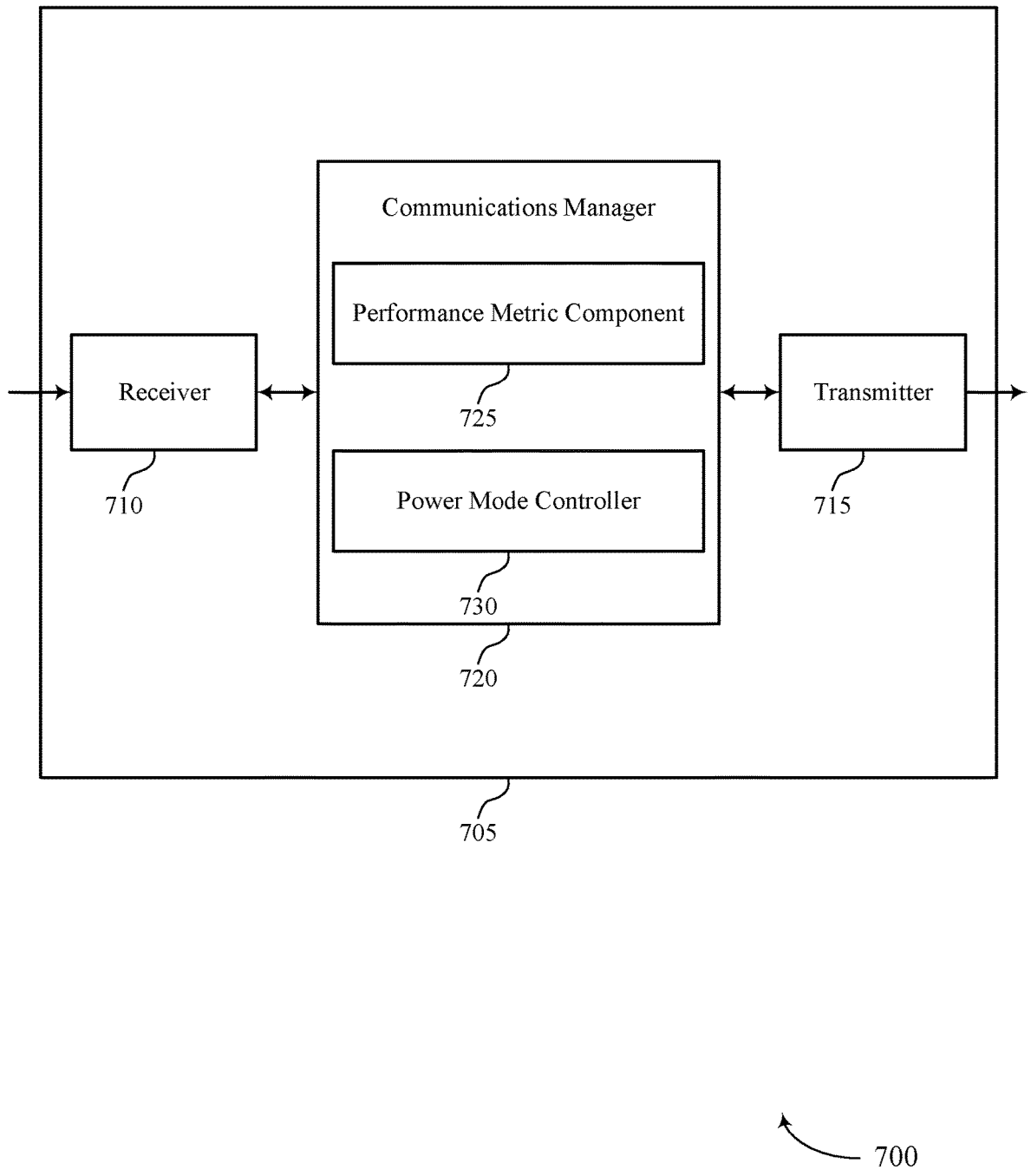

FIG. 7 shows a block diagram 700 of a device 705 that supports techniques for adaptive power mode control in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for adaptive power mode control). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for adaptive power mode control). In some examples, the transmitter 715 may be co-located with a receiver 710 in a transceiver. The transmitter 715 may utilize a single antenna or a set of multiple antennas.

The device 705, or various components thereof, may be an example of means for performing various aspects of techniques for adaptive power mode control as described herein. For example, the communications manager 720 may include a performance metric component 725 a power mode controller 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The performance metric component 725 may be configured as or otherwise support a means for determining one or more performance metrics related to communications over a wireless channel. The performance metric component 725 may be configured as or otherwise support a means for comparing the one or more performance metrics with a performance level for the communications over the wireless channel. The power mode controller 730 may be configured as or otherwise support a means for selecting a power mode for the UE based on the comparing. The power mode controller 730 may be configured as or otherwise support a means for determining an operating state of a subset of a plurality of radio frequency front end elements of at least one active radio frequency chain of the UE based on the power mode and a priority of the one or more performance metrics. The power mode controller 730 may be configured as or otherwise support a means for adjusting the subset of the plurality of radio frequency front end elements based on the operating state.

Figure 8:
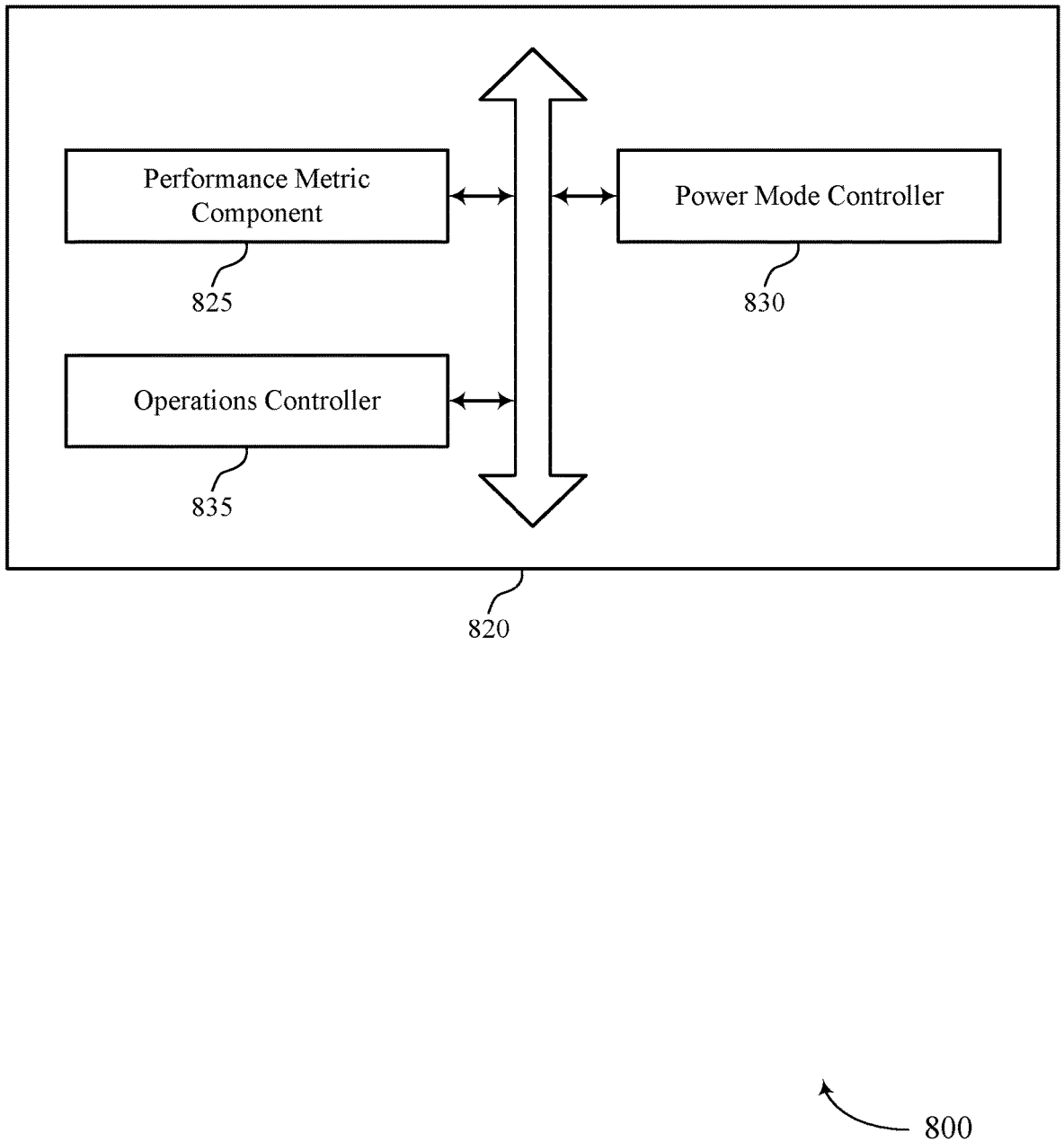
FIG. 8 shows a block diagram of a communications manager that supports techniques for adaptive power mode control in accordance with various aspects of the present disclosure.

FIG. 8 shows a block diagram 800 of a communications manager 820 that supports techniques for adaptive power mode control in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for adaptive power mode control as described herein. For example, the communications manager 820 may include a performance metric component 825, a power mode controller 830, an operations controller 835, or any combination thereof. Each of these components may communicate, directly or indirectly, with one another (e.g., via one or more buses).

The communications manager 820 may support wireless communications at a UE in accordance with examples as disclosed herein. The performance metric component 825 may be configured as or otherwise support a means for determining one or more performance metrics related to communications over a wireless channel. In some examples, the performance metric component 825 may be configured as or otherwise support a means for comparing the one or more performance metrics with a performance level for the communications over the wireless channel. The power mode controller 830 may be configured as or otherwise support a means for selecting a power mode for the UE based on the comparing. In some examples, the power mode controller 830 may be configured as or otherwise support a means for determining an operating state of a subset of a plurality of radio frequency front end elements of at least one active radio frequency chain of the UE based on the power mode and a priority of the one or more performance metrics. In some examples, the power mode controller 830 may be configured as or otherwise support a means for adjusting the subset of the plurality of radio frequency front end elements based on the operating state.

In some examples, to support determining the one or more performance metrics, the performance metric component 825 may be configured as or otherwise support a means for determining at least one network metric, where the at least one network metric includes one or more of a number of resource grants, a number of downlink grants, a modulation and coding scheme, a throughput, a latency, a block error rate, a hybrid automatic repeat request state, or combinations thereof.

In some examples, to support determining the one or more performance metrics, the performance metric component 825 may be configured as or otherwise support a means for determining at least one channel metric, where the at least one channel metric includes one or more of a signal-to-noise ratio, a signal-to-interference-plus-noise ratio, a reference signal receive power, a channel quality index, a rank indicator, a channel state feedback, or combinations thereof.

In some examples, the performance metric component 825 may be configured as or otherwise support a means for determining the performance level for the communications over the wireless channel. In some examples, the performance metric component 825 may be configured as or otherwise support a means for determining the priority of the set of multiple performance metrics. In some examples, prioritizing the set of multiple performance metrics may be based on one or more availability indicators.

In some examples, to support determining the operating state of the subset of the plurality of radio frequency front end elements of at least one active radio frequency chain of the UE based on the power mode and the priority, the power mode controller 830 may be configured as or otherwise support a means for adjusting a first active radio frequency front end element of the subset of the plurality of radio frequency front end elements, where the first active radio frequency front end element has a largest impact on power savings of the subset of the plurality of radio frequency front end elements.

In some examples, to support determining the one or more performance metrics, the performance metric component 825 may be configured as or otherwise support a means for calculating an aggregate performance state from the one or more performance metrics, where the comparing the one or more performance metrics with the performance level further includes comparing the aggregate performance state with the performance level.

In some examples, to support determining the one or more performance metrics, the performance metric component 825 may be configured as or otherwise support a means for averaging each of the one or more performance metrics over a time window.

In some examples, the subset of the plurality of radio frequency front end elements includes one or more of an ADC resolution, an ADC master bias current, a number of taps of a filter, an automatic gain control gain setting stage, a number of antenna elements, a number of beams of an antenna array, an analog filter linearity, or combinations thereof.

In some examples, to support determining the power mode for the subset of the plurality of radio frequency front end elements of at least one active radio frequency chain of the UE, the power mode controller 830 may be configured as or otherwise support a means for determining the power mode based on a look-up table of channel metrics or network metrics.

In some examples, to support determining the one or more performance metrics, the performance metric component 825 may be configured as or otherwise support a means for determining at least one channel metric and at least one network metric.

In some examples, to support comparing the one or more performance metrics with a performance level for the communications over the wireless channel, the performance metric component 825 may be configured as or otherwise support a means for comparing the one or more performance metrics with a threshold based on the performance level.

In some examples, to support determining the power mode, the power mode controller 830 may be configured as or otherwise support a means for selecting a higher power mode when the one or more performance metrics is above the threshold. In some examples, to support determining the power mode, the power mode controller 830 may be configured as or otherwise support a means for selecting a lower power mode when the one or more performance metrics exceeds the threshold.

In some examples, the power mode controller 830 may be configured as or otherwise support a means for selecting the power mode from a set of three or more power modes based on the comparing.

In some examples, the operations controller 835 may be configured as or otherwise support a means for determining whether the UE is operating in a first frequency range or a second frequency range, where determining the operating state of subset of the plurality of radio frequency front end elements is further based on the first frequency range or the second frequency range.

Figure 9:
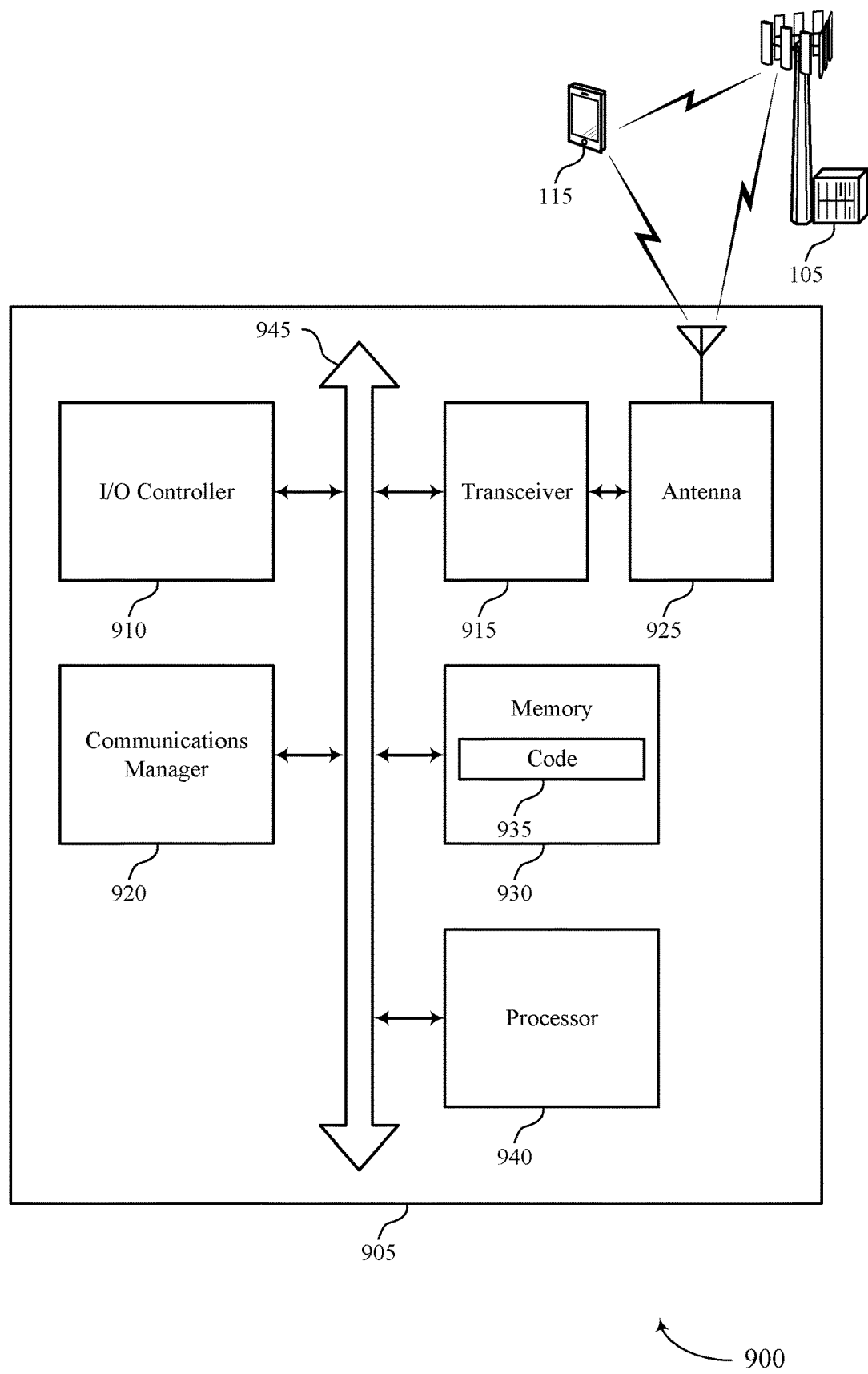
FIG. 9 shows a diagram of a system including a device that supports techniques for adaptive power mode control in accordance with various aspects of the present disclosure.

FIG. 9 shows a diagram of a system 900 including a device 905 that supports techniques for adaptive power mode control in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for adaptive power mode control). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for determining one or more performance metrics related to communications over a wireless channel. The communications manager 920 may be configured as or otherwise support a means for comparing the one or more performance metrics with a performance level for the communications over the wireless channel. The communications manager 920 may be configured as or otherwise support a means for selecting a power mode for the UE based on the comparing. The communications manager 920 may be configured as or otherwise support a means for determining an operating state of a subset of a plurality of radio frequency front end elements of at least one active radio frequency chain of the UE based on the power mode and a priority of the one or more performance metrics. The communications manager 920 may be configured as or otherwise support a means for adjusting the subset of the plurality of radio frequency front end elements based on the operating state.

By including or configuring the communications manager 920 in accordance with examples as described herein, the device 905 may support techniques for adaptive power mode control. The techniques may improve power savings at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for adaptive power mode control as described herein, or the processor 940 and the memory 930 may be otherwise configured to perform or support such operations.

Figure 10:
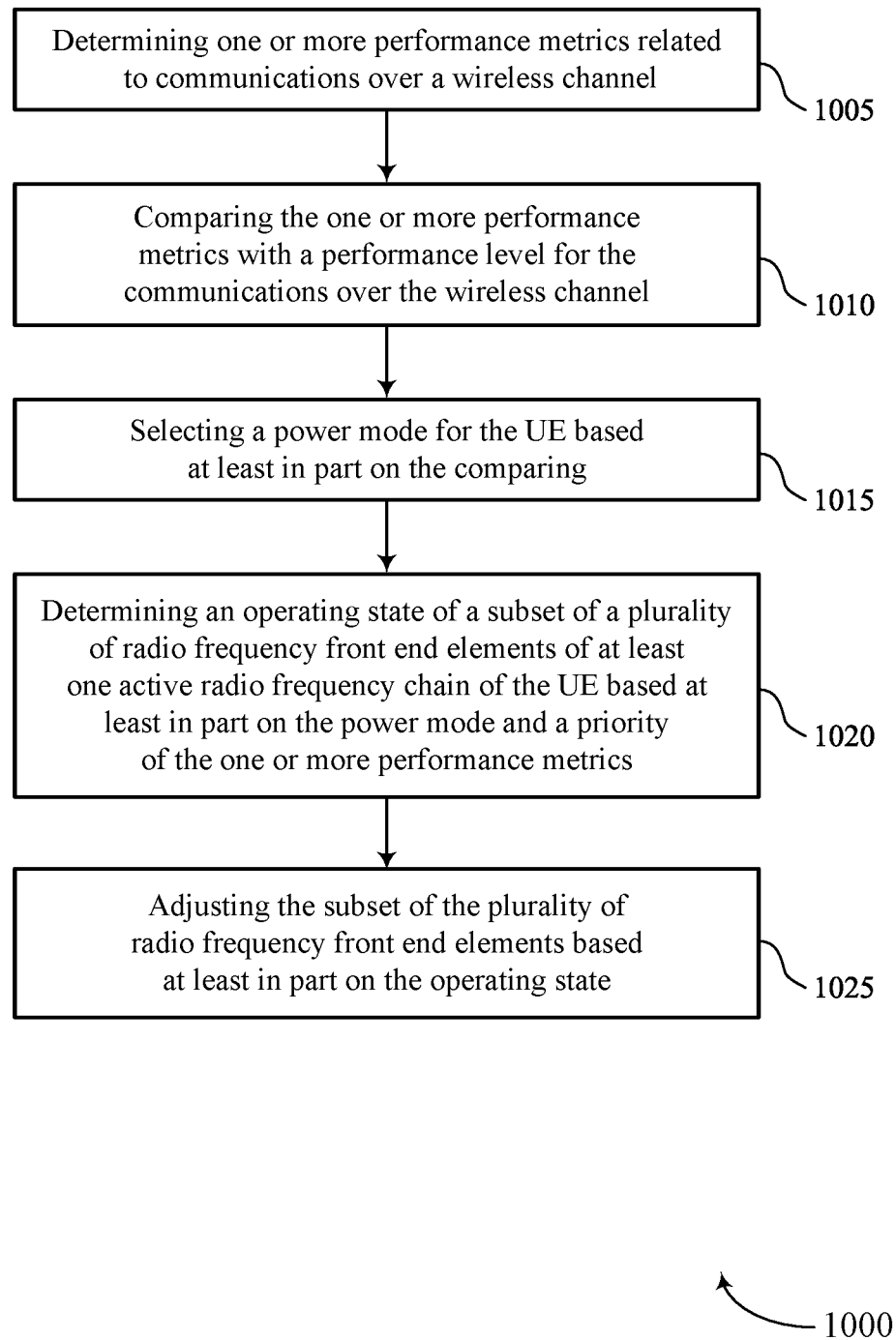
FIGS. 10 through 12 show flowcharts illustrating methods that support techniques for adaptive power mode control in accordance with various aspects of the present disclosure.

FIG. 10 shows a flowchart illustrating a method 1000 that supports techniques for adaptive power mode control in accordance with various aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include determining one or more performance metrics related to communications over a wireless channel. The operations of 1005 may be performed in accordance with examples as disclosed herein. In some examples, aspects of the operations of 1005 may be performed by a performance metric component 825 as described with reference to FIG. 8.

At 1010, the method may include comparing the one or more performance metrics with a performance level for the communications over the wireless channel. The operations of 1010 may be performed in accordance with examples as disclosed herein. In some examples, aspects of the operations of 1010 may be performed by a performance metric component 825 as described with reference to FIG. 8.

At 1015, the method may include selecting a power mode for the UE based on the comparing. The operations of 1015 may be performed in accordance with examples as disclosed herein. In some examples, aspects of the operations of 1015 may be performed by a power mode controller 830 as described with reference to FIG. 8.

At 1020, the method may include determining an operating state of a subset of a plurality of radio frequency front end elements of at least one active radio frequency chain of the UE based on the power mode and a priority of the one or more performance metrics. The operations of 1020 may be performed in accordance with examples as disclosed herein. In some examples, aspects of the operations of 1020 may be performed by a power mode controller 830 as described with reference to FIG. 8.

At 1025, the method may include adjusting the subset of the plurality of radio frequency front end elements based on the operating state. The operations of 1025 may be performed in accordance with examples as disclosed herein. In some examples, aspects of the operations of 1025 may be performed by a power mode controller 830 as described with reference to FIG. 8.

Figure 11:
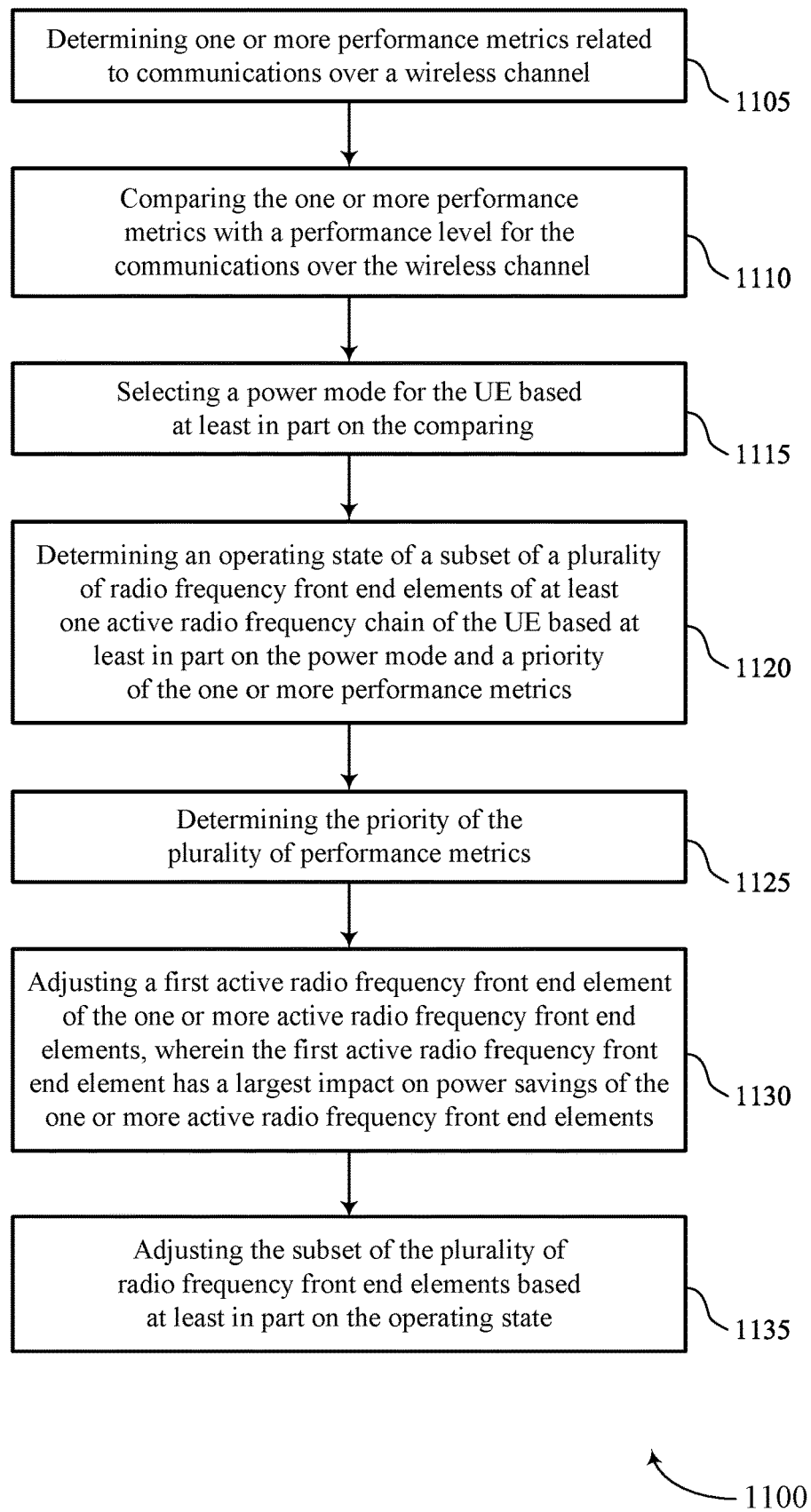

FIG. 11 shows a flowchart illustrating a method 1100 that supports techniques for adaptive power mode control in accordance with various aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include determining one or more performance metrics related to communications over a wireless channel. The operations of 1105 may be performed in accordance with examples as disclosed herein. In some examples, aspects of the operations of 1105 may be performed by a performance metric component 825 as described with reference to FIG. 8.

At 1110, the method may include comparing the one or more performance metrics with a performance level for the communications over the wireless channel. The operations of 1110 may be performed in accordance with examples as disclosed herein. In some examples, aspects of the operations of 1110 may be performed by a performance metric component 825 as described with reference to FIG. 8.

At 1115, the method may include selecting a power mode for the UE based on the comparing. The operations of 1115 may be performed in accordance with examples as disclosed herein. In some examples, aspects of the operations of 1115 may be performed by a power mode controller 830 as described with reference to FIG. 8.

At 1120, the method may include determining an operating state of a subset of a plurality of radio frequency front end elements of at least one active radio frequency chain of the UE based on the power mode and a priority of the one or more performance metrics. The operations of 1120 may be performed in accordance with examples as disclosed herein. In some examples, aspects of the operations of 1120 may be performed by a power mode controller 830 as described with reference to FIG. 8.

At 1125, the method may include determining the priority of the set of multiple performance metrics. The operations of 1125 may be performed in accordance with examples as disclosed herein. In some examples, aspects of the operations of 1125 may be performed by a performance metric component 825 as described with reference to FIG. 8.

At 1130, the method may include adjusting a first active radio frequency front end element of the subset of the plurality of radio frequency front end elements, where the first active radio frequency front end element has a largest impact on power savings of the one or more active radio frequency front end elements. The operations of 1130 may be performed in accordance with examples as disclosed herein. In some examples, aspects of the operations of 1130 may be performed by a power mode controller 830 as described with reference to FIG. 8.

At 1135, the method may include adjusting the subset of the plurality of radio frequency front end elements based on the operating state. The operations of 1135 may be performed in accordance with examples as disclosed herein. In some examples, aspects of the operations of 1135 may be performed by a power mode controller 830 as described with reference to FIG. 8.

Figure 12:
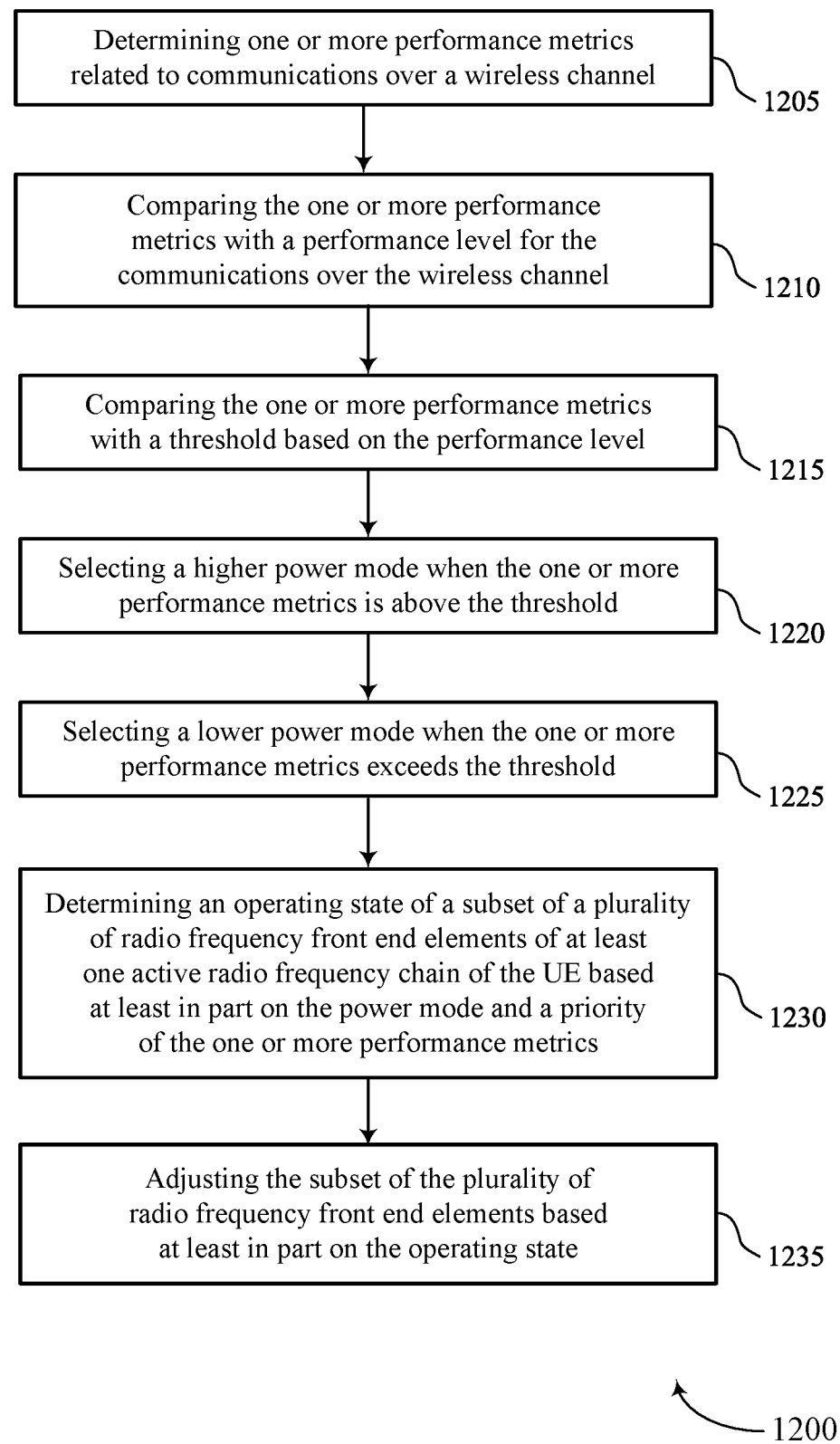

FIG. 12 shows a flowchart illustrating a method 1200 that supports techniques for adaptive power mode control in accordance with various aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include determining one or more performance metrics related to communications over a wireless channel. The operations of 1205 may be performed in accordance with examples as disclosed herein. In some examples, aspects of the operations of 1205 may be performed by a performance metric component 825 as described with reference to FIG. 8.

At 1210, the method may include comparing the one or more performance metrics with a performance level for the communications over the wireless channel. The operations of 1210 may be performed in accordance with examples as disclosed herein. In some examples, aspects of the operations of 1210 may be performed by a performance metric component 825 as described with reference to FIG. 8.

At 1215, the method may include comparing the one or more performance metrics with a threshold based on the performance level. The operations of 1215 may be performed in accordance with examples as disclosed herein. In some examples, aspects of the operations of 1215 may be performed by a performance metric component 825 as described with reference to FIG. 8.

At 1220, the method may include selecting a higher power mode when the one or more performance metrics is above the threshold. The operations of 1220 may be performed in accordance with examples as disclosed herein. In some examples, aspects of the operations of 1220 may be performed by a power mode controller 830 as described with reference to FIG. 8.

At 1225, the method may include selecting a lower power mode when the one or more performance metrics exceeds the threshold. The operations of 1225 may be performed in accordance with examples as disclosed herein. In some examples, aspects of the operations of 1225 may be performed by a power mode controller 830 as described with reference to FIG. 8.

At 1230, the method may include determining an operating state of a subset of a plurality of radio frequency front end elements of at least one active radio frequency chain of the UE based on the power mode and a priority of the one or more performance metrics. The operations of 1230 may be performed in accordance with examples as disclosed herein. In some examples, aspects of the operations of 1230 may be performed by a power mode controller 830 as described with reference to FIG. 8.

At 1235, the method may include adjusting the subset of the plurality of radio frequency front end elements based on the operating state. The operations of 1235 may be performed in accordance with examples as disclosed herein. In some examples, aspects of the operations of 1235 may be performed by a power mode controller 830 as described with reference to FIG. 8.

The following provides an overview of aspects of the present disclosure:

Aspect 1: A method for wireless communications at a UE, comprising: determining one or more performance metrics related to communications over a wireless channel; comparing the one or more performance metrics with a performance level for the communications over the wireless channel; selecting a power mode for the UE based at least in part on the comparing; determining an operating state of one or more active radio frequency front end elements of at least one radio frequency chain of the UE based at least in part on the power mode and a priority of the one or more performance metrics; and adjusting the one or more active radio frequency front end elements based at least in part on the operating state.

Aspect 2: The method of aspect 1, wherein determining the one or more performance metrics further comprises: determining at least one network metric, wherein the at least one network metric includes one or more of a number of resource grants, a number of downlink grants, a modulation and coding scheme, a throughput, a latency, a block error rate, a hybrid automatic repeat request state, or combinations thereof.

Aspect 3: The method of any of aspects 1 through 2, wherein determining the one or more performance metrics further comprises: determining at least one channel metric, wherein the at least one channel metric includes one or more of a signal-to-noise ratio, a signal-to-interference-plus-noise ratio, a reference signal receive power, a channel quality index, a rank indicator, a channel state feedback, or combinations thereof.

Aspect 4: The method of any of aspects 1 through 3, further comprising: determining the performance level for the communications over the wireless channel.

Aspect 5: The method of any of aspects 1 through 4, wherein determining the one or more performance metrics further comprises determining a plurality of performance metrics, the method further comprising: determining the priority of the plurality of performance metrics.

Aspect 6: The method of aspect 5, wherein prioritizing the plurality of performance metrics is based at least in part on one or more availability indicators.

Aspect 7: The method of any of aspects 5 through 6, wherein determining the operating state of the one or more active radio frequency front end elements of at least one radio frequency chain of the UE based at least in part on the power mode and the priority further comprises: adjusting a first active radio frequency front end element of the one or more active radio frequency front end elements, wherein the first active radio frequency front end element has a largest impact on power savings of the one or more active radio frequency front end elements.

Aspect 8: The method of any of aspects 1 through 7, wherein determining the one or more performance metrics further comprises: calculating an aggregate performance state from the one or more performance metrics, wherein the comparing the one or more performance metrics with the performance level further comprises comparing the aggregate performance state with the performance level.

Aspect 9: The method of any of aspects 1 through 8, wherein determining the one or more performance metrics further comprises: averaging each of the one or more performance metrics over a time window.

Aspect 10: The method of any of aspects 1 through 9, wherein the one or more active radio frequency front end elements include one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

Aspect 11: The method of any of aspects 1 through 10, wherein determining the power mode for the one or more active radio frequency front end elements of at least one radio frequency chain of the UE further comprises: determining the power mode based on a look-up table of channel metrics or network metrics.

Aspect 12: The method of any of aspects 1 through 11, wherein determining the one or more performance metrics further comprises: determining at least one channel metric and at least one network metric.

Aspect 13: The method of any of aspects 1 through 12, wherein comparing the one or more performance metrics with a performance level for the communications over the wireless channel further comprises: comparing the one or more performance metrics with a threshold based on the performance level.

Aspect 14: The method of aspect 13, wherein determining the power mode further comprises: selecting a higher power mode when the one or more performance metrics is above the threshold; and selecting a lower power mode when the one or more performance metrics exceeds the threshold.

Aspect 15: The method of any of aspects 1 through 14, wherein determining the power mode for the UE further comprising: selecting the power mode from a set of three or more power modes based at least in part on the comparing.

Aspect 16: The method of any of aspects 1 through 15, further comprising: determining whether the UE is operating in a first frequency range or a second frequency range, wherein determining the operating state of one or more active radio frequency front end elements is further based at least in part on the first frequency range or the second frequency range.

Aspect 17: An apparatus for wireless communications at a UE, comprising a processor; memory coupled with the processor; and instructions stored in the memory and executable by the processor to cause the apparatus to perform a method of any of aspects 1 through 16.

Aspect 18: An apparatus for wireless communications at a UE, comprising at least one means for performing a method of any of aspects 1 through 16.

Aspect 19: A non-transitory computer-readable medium storing code for wireless communications at a UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   determining one or more performance metrics related to communications over a wireless channel;
   comparing the one or more performance metrics with a performance level for the communications over the wireless channel;
   selecting a power mode for the UE based at least in part on the comparing;
   determining an operating state of a subset of a plurality of radio frequency front end elements of at least one active radio frequency chain of the UE based at least in part on the power mode and a priority of the one or more performance metrics; and
   adjusting the subset of the plurality of radio frequency front end elements based at least in part on the operating state.

2. The method of claim 1, wherein determining the one or more performance metrics further comprises:
   determining at least one network metric, wherein the at least one network metric includes one or more of a number of resource grants, a number of downlink grants, a modulation and coding scheme, a throughput, a latency, a block error rate, a hybrid automatic repeat request state, or combinations thereof.

3. The method of claim 1, wherein determining the one or more performance metrics further comprises:
   determining at least one channel metric, wherein the at least one channel metric includes one or more of a signal-to-noise ratio, a signal-to-interference-plus-noise ratio, a reference signal receive power, a channel quality index, a rank indicator, a channel state feedback, or combinations thereof.

4. The method of claim 1, wherein determining the one or more performance metrics further comprises determining a plurality of performance metrics, the method further comprising:
   determining the priority of the plurality of performance metrics.

5. The method of claim 4, wherein prioritizing the plurality of performance metrics is based at least in part on one or more availability indicators.

6. The method of claim 4, wherein determining the operating state of the subset of the plurality of radio frequency front end elements of at least one active radio frequency chain of the UE based at least in part on the power mode and the priority further comprises:
adjusting a first radio frequency front end element of the plurality of radio frequency front end elements, wherein the first radio frequency front end element has a largest impact on power savings of the plurality of radio frequency front end elements.

7. The method of claim 1, wherein determining the one or more performance metrics further comprises:
calculating an aggregate performance state from the one or more performance metrics, wherein the comparing the one or more performance metrics with the performance level further comprises comparing the aggregate performance state with the performance level.

8. The method of claim 1, wherein determining the one or more performance metrics further comprises:
averaging each of the one or more performance metrics over a time window.

9. The method of claim 1, wherein the subset of the plurality of radio frequency front end elements includes one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

10. The method of claim 1, wherein determining the power mode for the subset of the plurality of radio frequency front end elements of at least one active radio frequency chain of the UE further comprises:
determining the power mode based on a look-up table of channel metrics or network metrics.

11. The method of claim 1, wherein determining the one or more performance metrics further comprises:
determining at least one channel metric and at least one network metric.

12. The method of claim 1, wherein:
comparing the one or more performance metrics with a performance level for the communications over the wireless channel further comprises:
comparing the one or more performance metrics with a threshold based on the performance level; and
determining the power mode further comprises:
selecting a higher power mode when the one or more performance metrics is above the threshold; and
selecting a lower power mode when the one or more performance metrics exceeds the threshold.

13. The method of claim 1, wherein determining the power mode for the UE further comprising:
selecting the power mode from a set of three or more power modes based at least in part on the comparing.

14. The method of claim 1, further comprising:
determining whether the UE is operating in a first frequency range or a second frequency range, wherein determining the operating state of a subset of the plurality of radio frequency front end elements is further based at least in part on the first frequency range or the second frequency range.

15. An apparatus for wireless communications at a user equipment (UE), comprising:
a processor;
memory coupled with the processor; and
instructions stored in the memory and executable by the processor to cause the apparatus to:
determine one or more performance metrics related to communications over a wireless channel;
compare the one or more performance metrics with a performance level for the communications over the wireless channel;
select a power mode for the UE based at least in part on the comparing;
determine an operating state of a subset of a plurality of radio frequency front end elements of at least one active radio frequency chain of the UE based at least in part on the power mode and a priority of the one or more performance metrics; and
adjust the subset of the plurality of radio frequency front end elements based at least in part on the operating state.

16. The apparatus of claim 15, wherein the instructions to determine the one or more performance metrics are further executable by the processor to cause the apparatus to:
determine at least one network metric, wherein the at least one network metric includes one or more of a number of resource grants, a number of downlink grants, a modulation and coding scheme, a throughput, a latency, a block error rate, a hybrid automatic repeat request state, or combinations thereof.

17. The apparatus of claim 15, wherein the instructions to determine the one or more performance metrics are further executable by the processor to cause the apparatus to:
determine at least one channel metric, wherein the at least one channel metric includes one or more of a signal-to-noise ratio, a signal-to-interference-plus-noise ratio, a reference signal receive power, a channel quality index, a rank indicator, a channel state feedback, or combinations thereof.

18. The apparatus of claim 15, wherein the instructions to determine the one or more performance metrics further comprises instructions to determine a plurality of performance metrics, the instructions executable by the processor to cause the apparatus to:
determine the priority of the plurality of performance metrics.

19. The apparatus of claim 18, wherein prioritizing the plurality of performance metrics is based at least in part on one or more availability indicators.

20. The apparatus of claim 18, wherein the instructions to determine the operating state of the subset of the plurality of radio frequency front end elements of at least one active radio frequency chain of the UE based at least in part on the power mode and the priority are further executable by the processor to cause the apparatus to:
adjust a first active radio frequency front end element of the subset of the plurality of radio frequency front end elements, wherein the first active radio frequency front end element has a largest impact on power savings of the subset of the plurality of radio frequency front end elements.

21. The apparatus of claim 15, wherein the instructions to determine the one or more performance metrics are further executable by the processor to cause the apparatus to:
calculate an aggregate performance state from the one or more performance metrics, wherein the comparing the one or more performance metrics with the performance level further comprises comparing the aggregate performance state with the performance level.

22. The apparatus of claim 15, wherein the instructions to determine the one or more performance metrics are further executable by the processor to cause the apparatus to:
average each of the one or more performance metrics over a time window.

23. The apparatus of claim 15, wherein the subset of the plurality of radio frequency front end elements includes one or more of an analog-to-digital converter resolution, an analog-to-digital converter master bias current, a number of taps of a filter, an automatic gain control gain setting stage, a number of antenna elements, a number of beams of an antenna array, an analog filter linearity, or combinations thereof.

24. The apparatus of claim 15, wherein the instructions to determine the power mode for the subset of the plurality of radio frequency front end elements of at least one active radio frequency chain of the UE are further executable by the processor to cause the apparatus to:
determine the power mode based on a look-up table of channel metrics or network metrics.

25. The apparatus of claim 15, wherein the instructions to determine the one or more performance metrics are further executable by the processor to cause the apparatus to:
determine at least one channel metric and at least one network metric.

26. The apparatus of claim 15, wherein:
the instructions to compare the one or more performance metrics with a performance level for the communications over the wireless channel are further executable by the processor to cause the apparatus to:
compare the one or more performance metrics with a threshold based on the performance level; and
the instructions to determine the power mode are further executable by the processor to cause the apparatus to:
select a higher power mode when the one or more performance metrics is above the threshold; and
select a lower power mode when the one or more performance metrics exceeds the threshold.

27. The apparatus of claim 15, wherein the instructions are further executable by the processor to cause the apparatus to:
select the power mode from a set of three or more power modes based at least in part on the comparing.

28. The apparatus of claim 15, wherein the instructions are further executable by the processor to cause the apparatus to:
determine whether the UE is operating in a first frequency range or a second frequency range, wherein determining the operating state of subset of the plurality of radio frequency front end elements is further based at least in part on the first frequency range or the second frequency range.

29. An apparatus for wireless communications at a user equipment (UE), comprising:
means for determining one or more performance metrics related to communications over a wireless channel;
means for comparing the one or more performance metrics with a performance level for the communications over the wireless channel;
means for selecting a power mode for the UE based at least in part on the comparing;
means for determining an operating state of a subset of a plurality of radio frequency front end elements of at least one active radio frequency chain of the UE based at least in part on the power mode and a priority of the one or more performance metrics; and
means for adjusting the subset of the plurality of radio frequency front end elements based at least in part on the operating state.

30. A non-transitory computer-readable medium storing code for wireless communications at a user equipment (UE), the code comprising instructions executable by a processor to:
determine one or more performance metrics related to communications over a wireless channel;
compare the one or more performance metrics with a performance level for the communications over the wireless channel;
select a power mode for the UE based at least in part on the comparing;
determine an operating state of a subset of a plurality of radio frequency front end elements of at least one active radio frequency chain of the UE based at least in part on the power mode and a priority of the one or more performance metrics; and
adjust the subset of the plurality of radio frequency front end elements based at least in part on the operating state.

* * * * *